United States Patent [19]

Martz et al.

[11] 3,953,966
[45] May 4, 1976

[54] COMBINED CYCLE ELECTRIC POWER PLANT HAVING A CONTROL SYSTEM WHICH ENABLES DRY STEAM GENERATOR OPERATION DURING GAS TURBINE OPERATION

[75] Inventors: Lyle F. Martz, Verona, Pa.; Richard J. Plotnick, Cherry Hill, N.J.

[73] Assignee: Westinghouse Electric Corporation, Pittsburgh, Pa.

[22] Filed: Aug. 8, 1974

[21] Appl. No.: 495,765

[52] U.S. Cl. .............................. 60/39.02; 60/39.03; 60/39.18 B; 444/1; 235/150.1
[51] Int. Cl.[2] ......................................... F01K 23/10
[58] Field of Search ......... 60/39.02, 39.03, 39.18 R, 60/39.18 B

*Primary Examiner*—Allen M. Ostrager
*Attorney, Agent, or Firm*—E. F. Possessky

[57] ABSTRACT

A combined cycle electric power plant includes gas and steam turbines and a steam generator for recovering the heat in the exhaust gases exited from the gas turbine and for using the recovered heat to produce and supply steam to the steam turbine. A condenser is associated with the steam turbine for converting the spent steam from the steam turbine into condensate to be supplied to the steam generator. The steam generator includes a low pressure storage tank, a first heat exchange tube, a boiler feedwater pump for directing fluid from the low pressure storage tank through the first heat exchange tube, a main storage drum, a second heat exchange tube, and a high pressure recirculation pump for directing water from the main storage drum through the second heat exchange tube. An afterburner further heats the exhaust gas turbine gases passed to the first and second heat exchange tubes. Method and apparatus are provided for controlling the transfer of the operation of the steam generator from a WET mode of operation to a DRY mode of operation. In particular, the heat supplied to the gas turbine exhaust gases is reduced, the fluid introduced into the steam generator is cut off, a blowdown valve for directing fluid from the steam generator is opened to further drain fluid therefrom, heat is continued to be supplied to the first and second heat exchange tubes whereby steam is continued to be generated within said generator and directed to the steam turbine, and finally the outlets associated with the steam generator are closed and the steam generator is filled with a suitable non-corrosive fluid such as nitrogen gas.

33 Claims, 28 Drawing Figures

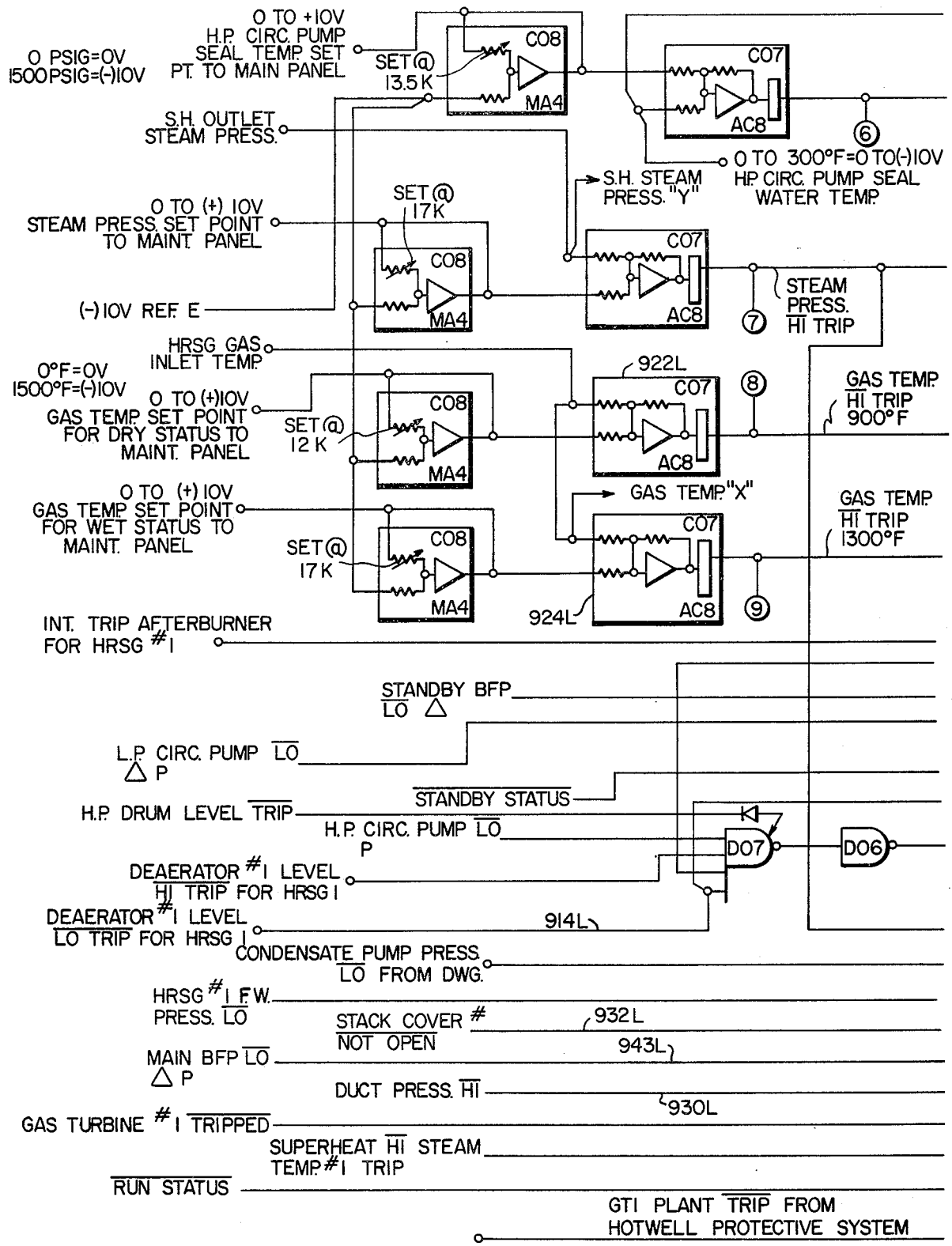
FIG. 7A
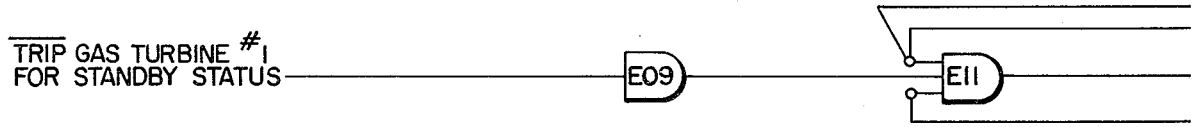

COMBINED CYCLE ELECTRIC POWER PLANT HAVING A CONTROL SYSTEM WHICH ENABLES DRY STEAM GENERATOR OPERATION DURING GAS TURBINE OPERATION

CROSS-REFERENCE TO RELATED APPLICATIONS

Reference is made to the following coassigned and concurrently filed patent applications all of which are hereby incorporated by reference:

1. Ser. No. 495,730, entitled "A Combined Cycle Electric Power Plant And A Gas Turbine Having Improved Megawatt Load Control", filed by Terry J. Reed and Jack R. Smith, assigned to the present assignee;
2. Ser. No. 495,727, entitled "Control Apparatus For Modulating The Inlet Guide Vanes Of A Gas Turbine Employed In A Combined Cycle Electric Power Generating Plant As A Function Of Load Or Inlet Blade Path Temperature", filed by Terry J. Reed and Jack R. Smith, assigned to the present assignee;
3. Ser. No. 495,738, entitled "A Combined Cycle Electric Power Plant And A Heat Recovery Steam Generator With Improved Fluid Level Control Therefor", filed by Lyle F. Martz and Richard J. Plotnick, assigned to the present assignee;
4. Ser. No. 495,724, entitled "A Combined Cycle Electric Power Pland And A Heat Recovery Steam Generator Having Improved Boiler Feed Pump Flow Control", filed by Lyle F. Martz and Richard J. Plotnick, assigned to the present assignee;
5. Ser. No. 495,700, entitled "A Combined Cycle Electric Power Plant And A Gas Turbine Having An Improved Startup Control Especially Useful In A Backup Control System", filed by Jack R. Smith and Terry J. Reed, assigned to the present assignee;
6. Ser. No. 497,345, entitled "A Combined Cycle Electric Power Plant With A Steam Turbine Having A Throttle Pressure Limiting Control", filed by Richard S. Heiser and Ola J. Aanstad, assigned to the present assignee;
7. Ser. No. 495,739, entitled "A Combined Cycle Electric Power Plant And A Gas Turbine Having An Improved Overspeed Protection System", filed by Jack R. Smith and Terry J. Reed, assigned to the present assignee;
8. Ser. No. 495,736, entitled "A Combined Cycle Electric Power Plant And A Heat Recovery Steam Generator Having Improved Multi-Loop Temperature Control Of The Steam Generated", filed by Lyle F. Martz and Richard J. Plotnick, assigned to the present assignee;
9. Ser. No. 495,731, entitled "Control Apparatus For Matching The Exhaust Flow Of A Gas Turbine Employed In A Combined Cycle Electric Power Generating Plant To The Requirements Of A Steam Generator Also Employed Therein", filed by Jack R. Smith, assigned to the present assignee;
10. Ser. No. 495,694, entitled "A Combined Cycle Electric Power Plant And A Gas Turbine Having Improved Outlet Temperature Limit Control", filed by Jack R. Smith and Terry J. Reed, assigned to the present assignee;
11. Ser. No. 495,693, entitled "A Combined Cycle Electric Power Plant And A Gas Turbine Having A Backup Control System With An Improved Feedforward Analog Speed/Load Control", filed by Roy W. Kiscaden and Milton M. Hobbs, assigned to the present assignee;
12. Ser. No. 495,728, entitled "Synchronization System For a Combined Cycle Electric Power Plant", filed by Joseph F. Barrett and Roy W. Kiscaden, assigned to the present assignee;
13. Ser. No. 495,725, entitled "A Smooth And Highly Responsive Gas Turbine Temperature Limit Control Especially Useful In Combined Cycle Electric Power Plants", filed by Joel M. Anderson, Kermit R. Wescott and Milton M. Hobbs, assigned to the present assignee;
14. Ser. No. 497,503, entitled "A Combined Cycle Electric Power Plant With A Steam Turbine Having A Sliding Pressure Main Bypass And Control Valve System", filed by Robert Uram, assigned to the present assignee;
15. Ser. No. 497,344, entitled "A Combined Cycle Electric Power Plant With A Steam Turbine Having An Improved Valve Control System", filed by Robert Uran, Ross Marano, Richard Heiser and Jeong Y. Surh, assigned to the present assignee;
16. Ser. No. 495,701, entitled "A Combined Cycle Electric Power Plant And A Gas Turbine Having Improved Liquid Fuel Flow Detection", filed by Milton M. Hobbs, assigned to the present assignee;
17. Ser. No. 495,702, entitled "A Combined Cycle Electric Power Plant And A Gas Turbine Having An Improved Fuel Transfer System", filed by Milton M. Hobbs, assigned to the present assignee;
18. Ser. No. 495,723, entitled "A Combined Cycle Electric Power Plant And A Heat Recovery Steam Generator Having Improved Temperature Control Of The Steam Generated", filed by Lyle F. Martz, assigned to the present assignee;
19. Ser. No. 495,732, entitled "Operator Interface System For A Combined Cycle Electric Power Plant", filed by Robert Uram, assigned to the present assignee;
20. Ser. No. 495,713, entitled "Manual/Automatic System For Synchronizing Multiple Turbines In A Combined Cycle Electric Power Plant", filed by Robert Uran, assigned to the present assignee;
21. Ser. No. 495,729, entitled "An Accurate, Stable And Highly Responsive Gas Turbine Startup Speed Control With Fixed Time Acceleration Especially Useful In Combined Cycle Electric Power Plants", filed by Robert Uram, assigned to the present assignee;
22. Ser. No. 495,715, entitled "Electric Power Plant Having a Gas Turbine With An Improved Wide Range Surge Protection System", filed by Jack R. Smith, assigned to the present assignee;
23. Ser. No. 495,722, entitled "Improved Digital/Analog Interface System Especially Useful In Turbine And Power Plant Control Systems", filed by Terry J. Reed and Jack R. Smith, assigned to the present assignee;
24. Ser. No. 495,726, entitled "Combined Cycle Electric Power Plant Having An Improved Digital/Analog Hybrid Gas Turbine Control System", filed by Roy W. Kiscaden, Terry J. Reed and Jack R. Smith, assigned to the present assignee;
25. Ser. No. 495,714, entitled "A Combined Cycle Electric Power Plant And A Gas Turbine And Afterburner Having Coordinated Fuel Transfer", filed by Lyle F. Martz, assigned to the present assignee.

Reference is also made to the following coassigned patent applications, all of which are hereby incorporated by reference:

1. Ser. No. 399,790, filed on Sept. 21, 1973, by Lyle F. Martz, Roy W. Kiscaden and Robert Uran, entitled "An Improved Gas Turbine And Steam Turbine Combined Cycle Electric Power Generating Plant Having A Coordinated And Hybridized Control System And An Improved Factory Based Method For Making and Testing Combined Cycle And Other Power Plants And Control Systems Therefor", assigned to the present assignee;

2. Ser. No. 319,114, filed on Dec. 29, 1972, by T. Giras and J. Reuther as a continuation of an earlier filed application Ser. No. 82,470, now abandoned, entitled "An Improved System And Method For Operating Industiral Gas Turbine Apparatus And Gas Turbine Electric Power Plants Preferably With A Digital Computer Control System" assigned to the present assignee;

3. Ser. No. 250,826 entitled "A Digital Computer Monitored And/Or Operated System Or Process Which is Structured For Operation With An Improved Automatic Programming Process And System", filed by J. Gomola et al, on May 5, 1972; and 4. Ser. No. 408,962 entitled "System And Method For Starting Synchronizing And Operating A Steam Turbine With Digital Computer Control", filed by Theodore C. Giras and Robert Uram, on Oct. 23, 1973.

BACKGROUND OF THE INVENTION

1. Field of the Invention

The present invention relates to a combined cycle electric power plant, and more particularly to a control of the operation of the plant's steam generator and of its transfer thereof from a WET mode to a DRY mode of operation.

2. State of the Prior Art

In the design of modern electric power plants, it is a significant object to achieve the greatest efficiency possible in the generation of electricity. To this end, steam generators are designed to extract heat efficiently from and to use the extracted heat to convert a fluid such as water into superheated steam at a relatively high pressure. Further, such steam generators have been incorporated into combined cycle electric generating plants including both gas and steam turbines wherein the exhaust gases of a gas turbine are used to heat water into steam, then to be transferred to the steam turbine. Typically, steam generators include a water heating section or economizer tube, a high pressure evaporator tube and finally a superheater tube, whereby water is gradually heated while increasing levels of pressure applied thereto to provide from the superheater tube, superheated steam to be supplied to the steam turbine. A condenser is associated with the steam turbine to receive the spent steam therefrom and to convert it into water condensate to be fed back to the steam generator.

In a combined cycle electric power plant, the steam turbine is combined with a gas turbine, whereby the heated exhaust gases of the gas turbine, otherwise lost to the atmosphere, are used to heat the circulated fluid and to convert it into steam to drive the steam turbine. In this manner, a significant reduction in the amount of fuel required to heat the steam is achieved and the heat contained in the gas turbine exhaust gases is effectively utilized. Further, an afterburner associated with the exhaust exit of the gas turbine serves to additionally heat the gas turbine exhaust gases, whereby the heat required to generate sufficient steam to meet load requirements is provided. In particular, under conditions of relatively high loads wherein the heat of the gas turbine exhaust gases is insufficient to supply the steam requirements, the afterburner is turned on to further heat the gas turbine exhaust gases.

Referring now to FIG. 1, there is shown a combined cycle electric power plant of the prior art including a gas turbine 162' whose output drives a generator 13'. The hot exhaust gases derived from the gas turbine 162' pass by way of duct 800L through a steam generator (boiler) 18' and out through a vent duct 66' into the atmosphere. The gas turbine exhaust gases are initially heated by the gas turbine 162' and then passed to the steam generator 18', whereby the heat therein may be transferred to a fluid passing therethrough.

The steam generator 18' produces a superheated steam which is supplied to a steam turbine 36' for driving a coupled generator 44'. The spent steam from the steam turbine 36' is passed through a condenser 31', which converts the spent steam into water condensate. The resulting condensate is pumped by a condensate pump 30' back to the steam generator 18' for use in making more steam.

If for some reason, such as the repair of the steam generator 18' or the steam turbine 36', the steam generator 18' or the steam turbine 36' is shut down, the gas turbine 162' may nevertheless continue to be operated by diverting its exhaust gas from the steam generator 18' to the atmosphere, by way of a bypass exhaust stack 808L. Such diversion is accomplished by a suitable diversion or gate mechanism, represented as a pivoted closure gate 806L movable from a first position shown in solid line wherein the gas turbine exhaust gases are directed to the steam generator 36', to a second position as shown in dotted line wherein the exhaust gas turbine gases are directed through the bypass duct 808L to the atmosphere. In the case where the closure gate 806L is disposed in the dotted line position as shown in FIG. B-41, no exhaust gas turbine gases pass to the steam generator 18'.

In practice, the closure mechanism represented generally by the numeral 806L in FIG. B-41, may take the form of two sets of grate structures or movable vanes, one for blocking off the passage to the steam generator 18' and the other for opening up the entrance of the bypass stack 808L. The operation of such mechanisms is cumbersome and such mechanisms have a decided tendencey to become defective.

SUMMARY OF THE INVENTION

It is therefore an object of this invention to eliminate the use of the bypass stack and associated closure mechanism of the prior art.

It is a more particular object of this invention to provide apparatus and method for controlling the operation of a heat recovery steam generator as incorporated into a combined cycle electric power plant, whereby the heat recovery steam generator may be transferred from a WET mode of operation to a DRY mode of operation.

It is a still further object of this invention to provide an improved method and apparatus for controlling the operation of a heat recovery steam generator as incorporated into a combined cycle electric power plant whereby the steam generator is run in a DRY mode and the gas turbine is operated at a reduced load level.

These and other objects are accomplished in accordance with the teachings of this invention by providing a combined cycle electric power plant including a gas turbine, a steam turbine, means for generating electric power under the driving power of the turbines, and steam generating means for receiving the exhaust gases of the gas turbine and for using heat therein for converting a transfer fluid such as water into steam to be supplied to the steam turbine. A method and apparatus are provided for contolling the heat recovery steam generator of the combined cycle electric power plant, for transfer from a WET mode of operation to a DRY mode of operation. In particular, the heat supply from the gas turbine is reduced by placing a reduced load level signal thereon and by terminating the flow of fuel to the afterburner. Further, the condensate inlets to the heat recovery steam generator as controlled by a condensate flow control valve and an extraction steam valve are closed whereby the flow of condensate from the condenser to the heat recovery system generator is terminated. The heat recovery steam generator is continued to be operated by supplying heat thereto whereby steam is continued to be generated and passed to the steam generator, thus reducing the levels of fluid within the storage tanks thereof. Finally, when the fluid levels within the deaerator storage tank and the main drum have been reduced to predetermined minimum limits, the outlets from the heat recovery steam generator are closed. At that time, a non-corrosive fluid such as nitrogen may be introduced into the heat recovery steam generator to reduce corrosion.

BRIEF DESCRIPTION OF THE DRAWINGS

FIGS. 5A, 5B and 5C, and 6A, 6B and 6C show functional diagrams of the transfer logic control for transferring the operation of the steam heat recovery generator from a WET to DRY mode;

FIGS. 7A, 7B and 7C, 8A, 8B and 8C, and 9A, 9B and 9C show in detailed schematic form the control circuitry as shown in a functional manner in FIGS. 5A, 5B and 5C, and 6A, 6B and 6C;

DESCRIPTION OF THE PREFERRED EMBODIMENTS

Figure 1:
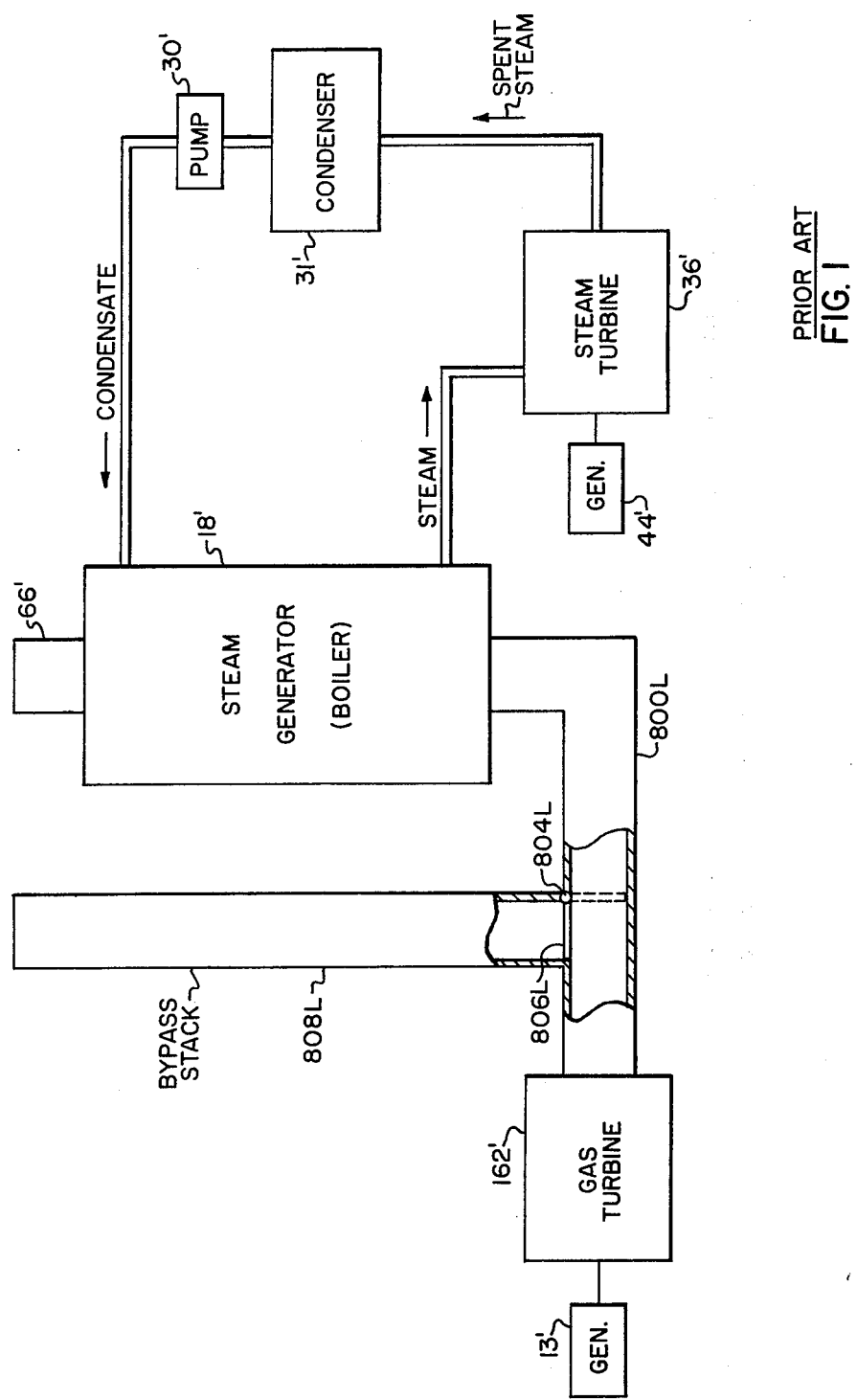
FIG. 1 shows in diagrammatic form a heat recovery steam generator of the prior art.

A description of the entire combined cycle electric power plant with respect to FIGS. 2A to 2G is found in Appendix A, attached hereto. Selected portions of the combined cycle electric power plant are shown in FIG. 3 as they relate to the operation of the heat recovery steam generator 18, and in particular to a transfer of the steam generator 18 from its WET to its DRY mode of operation. In FIG. 3, there is shown in a simplified manner a combined cycle electric power plant showing the elements pertinent to the present invention. As shown therein, a first gas turbine 162 drives a first electric generator 13. The exhaust gas from gas turbine 162 passes through a duct 814L and up through a stack structure 64 of a first heat recovery steam generator 18. Located within the stack structure 64 are four sets of boiler tubes 260–263. Tube set 263 is known as the low pressure evaporator, tube set 262 is known as the economizer, tube set 261 is known as the high pressure evaporator and tube set 260 is known as the superheater.

Additional heat is supplied to the stack structure 64 by an afterburner 16 which imparts additional heat to the gas turbine exhaust gas. Fuel for the gas turbine 162 is supplied by way of a control valve 14 from a fuel tank 700. Fuel is supplied to the afterburner 16 by way of a further control valve 19 from the same fuel tank 700.

It will be assumed initially that the heat recovery steam generator 18 is operating in the normal manner to produce steam. With this in mind, the water or condensate located in a lower reservoir (hot well) of a condenser 31 is pumped by a condensate pump 30 to a deaerator 68 by way of condensate lines 431, 432 and 434, a check valve 502 and a condensate control valve 32. Deaerator 68 serves to remove dissolved gases from the condensate, which gases are vented to the atmosphere by way of a Deaerator vent valve 514 which is normally open. The deaerated condensate is then passed to and stored in a low pressure storage tank 69.

Water in the storage tank 69 is pumped by a low pressure circulation pump 505 through the low pressure evaporator tubes 263 and back to the deaerator 68. The low pressure evaporator tubes 263 convert the water supplied thereto by pump 505 into low temperature steam, which is then used to provide some preliminary heating of the condensate in the deaerator 68 and storage tank 69. This raises the temperature of the water in the storage tank 69 to a value of approximately 300°F.

Warm water is pumped from the storage tank 69 by a boiler feed pump 524 through the economizer tubes 262 and into the hot water storage section 70a of a steam drum 70. Steam drum 70 also includes a moisture separator section 70b. In the actual construction, the storage section 70a is located below the separator section 70b. Economizer tubes 262 raise the temperature of the water to approximately 550°F, which temperature is just slightly below the boiling point at the pressure existing in the economizer tubes 262 and hot water storage section 70a.

A high pressure circulation pump 554 pumps the hot water from the storage section 70a into the high pressure evaporator tubes 261. Such evaporator tubes 261 convert the hot water into steam. This steam, which is in a wet condition, is supplied to the moisture separator section 70b. Moisture separator 70b removes the moisture and the resulting dry steam is supplied to the superheater tubes 260. Superheater tubes 260 raise the temperature of the steam from approximately 675°F (at output of moisture separator 70b) to a temperature of approximately 950°F at the output of superheater tubes 260.

This superheated steam is supplied by way of a steam line 39, a check valve 585, a normally open main steam stop valve 38, a steam line 34 and a throttle valve 35 to a steam turbine 36. This drives the steam turbine 36 which, in turn, drives a second electric generator 44. The spent steam leaving the exhaust end of steam turbine 36 passes into the condenser 31 which converts same back into condensate water at a temperature of approximately 100°F. This completes the primary steam/condensate loop.

Valve 45 is a main steam turbine bypass valve which is selectively manipulated to pass some of the superheated steam to a desuperheater 46 which cools the superheated steam and returns it to the condenser 31. The cooling action in the desuperheater 46 is provided by the lower temperature condensate supplied thereto by way of a branch condensate line 437 from the condenser 31.

Several auxiliary features are now considered. First, some of the steam is extracted from the steam turbine 36 at an intermediate stage therein by means of an extraction steam line 423. The extracted steam is then supplied by way of a check valve 511 and an extraction steam control valve 512 to the deaerator 68 to provide additional heating of the condensate in the deaerator 68. The main reason for doing this, however, is to keep the exhaust pressure at the exhaust end of the steam turbine 36 at a desired low level.

Chemicals for neutralizing any corrosive elements in the water supplied to the steam drum 70 are injected into the system at a point intermediate the low pressure storage tank 69 and the boiler feed pump 523. Such chemicals are obtained from a chemical feed supply 901 and are supplied by way of a pump 810L and a check valve 812L to the desired injection point.

Next, a blowdown mechanism comprises a blowdown line 816L, a blowdown control valve 596 and a blowdown line 597a. The lower end of a blowdown line 597a runs to a sewer or other appropriate place for disposing of unwanted waste water. In the normal operation of the system, the blowdown control valve 596 is opened to varying degrees to prevent the water in the system from becoming too conductive. An automatic control system (see FIG. 11) is provided which measures the water conductivity (a measure of the mineral content) at the output of the hot water storage section 70a. If the water at this point is too conductive, then blowdown valve 596 is opened up wider to dump some of such water into the sewer. Additional fresh water or more pure water is added through the condenser 31 to the condensate/steam loop from a make-up water storage tank 440 by opening a make-up valve 442 and energizing make-up pump 441, so that the resulting water mixture is less conductive. For present purposes, the blowdown valve 596 can be thought of as being normally in a slightly or partially open condition.

Figure 2A:
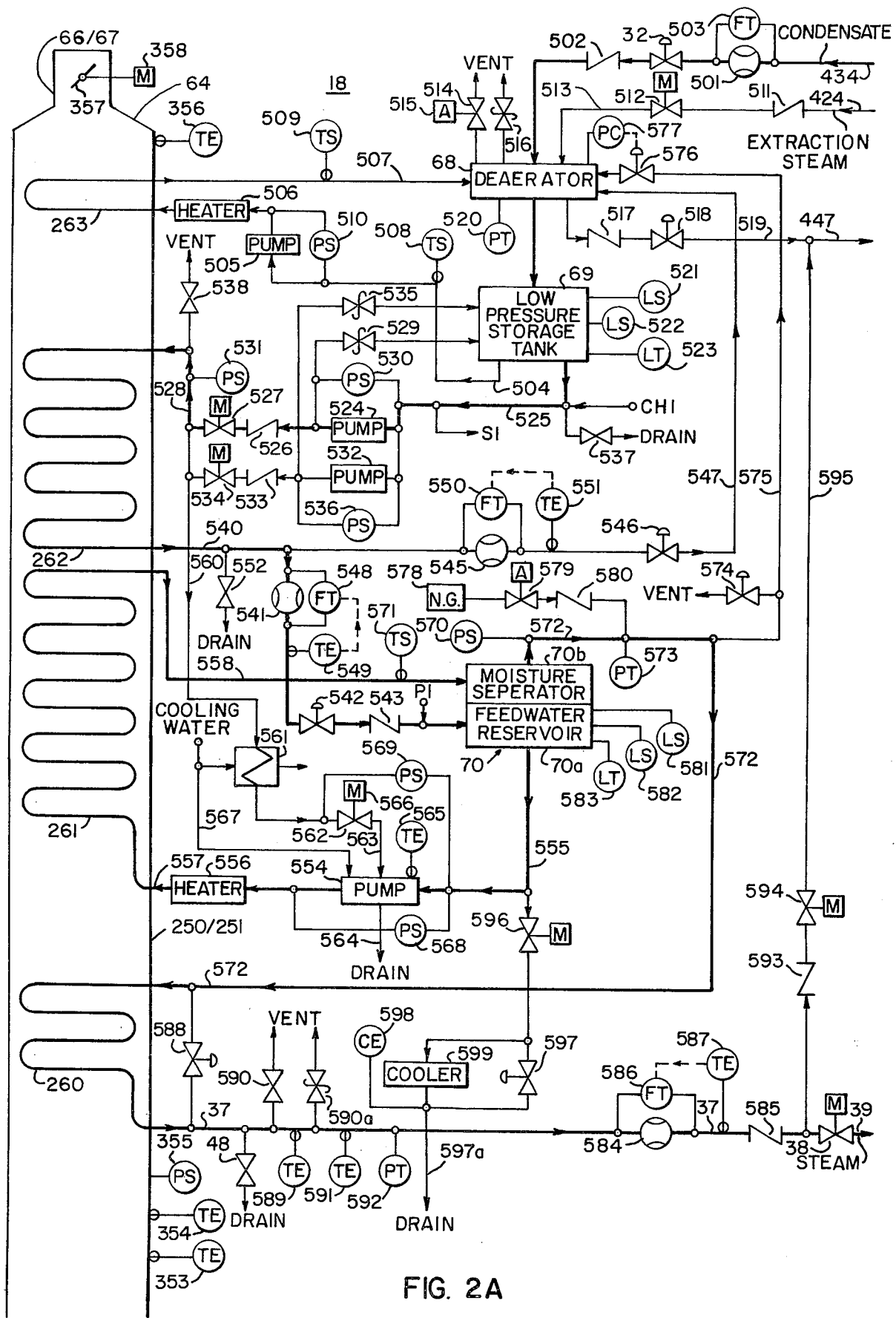
FIGS. 2A–2B show a detailed schematic diagram of the combined cycle power plant.
Figure 2B:
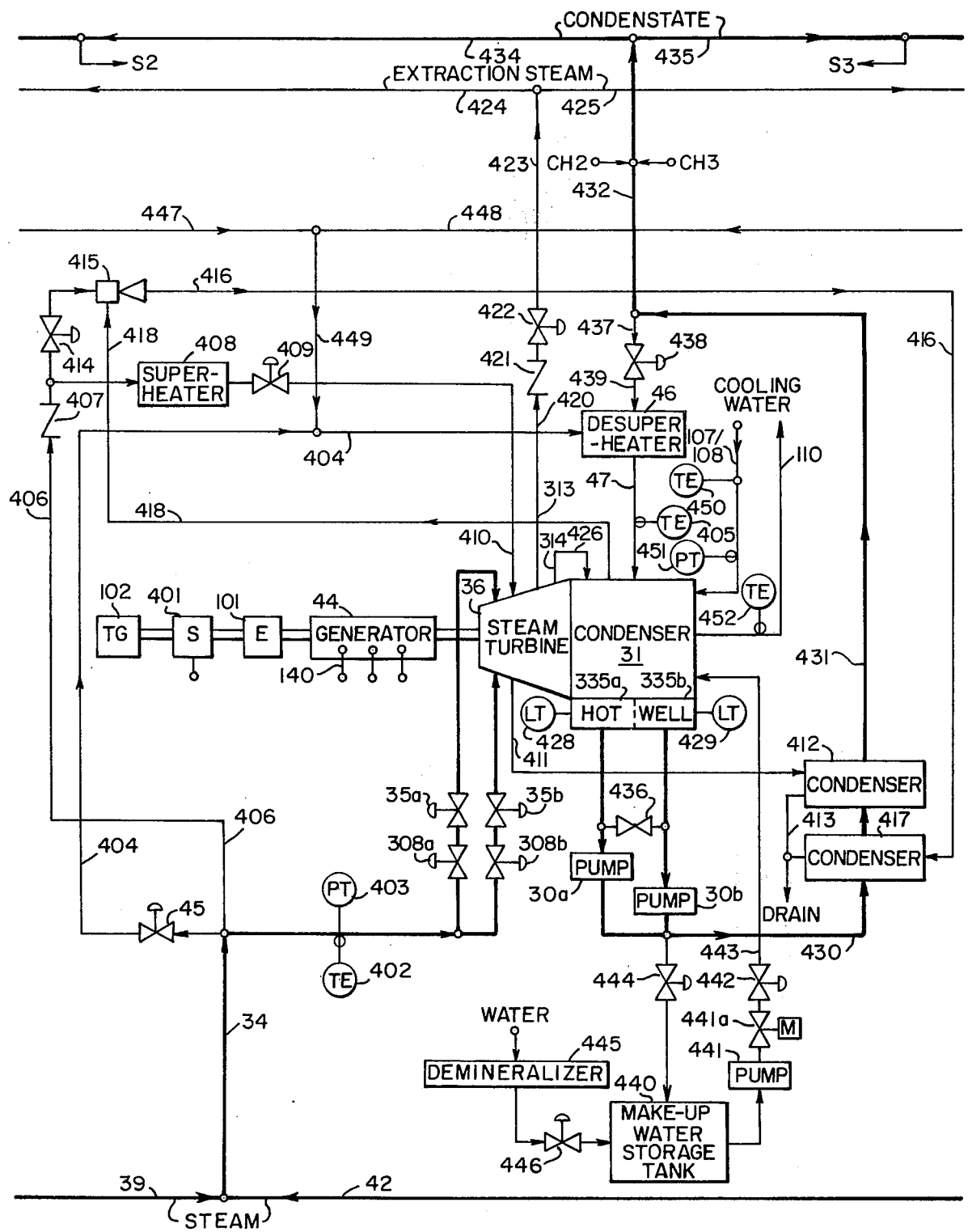
Figure 2C:
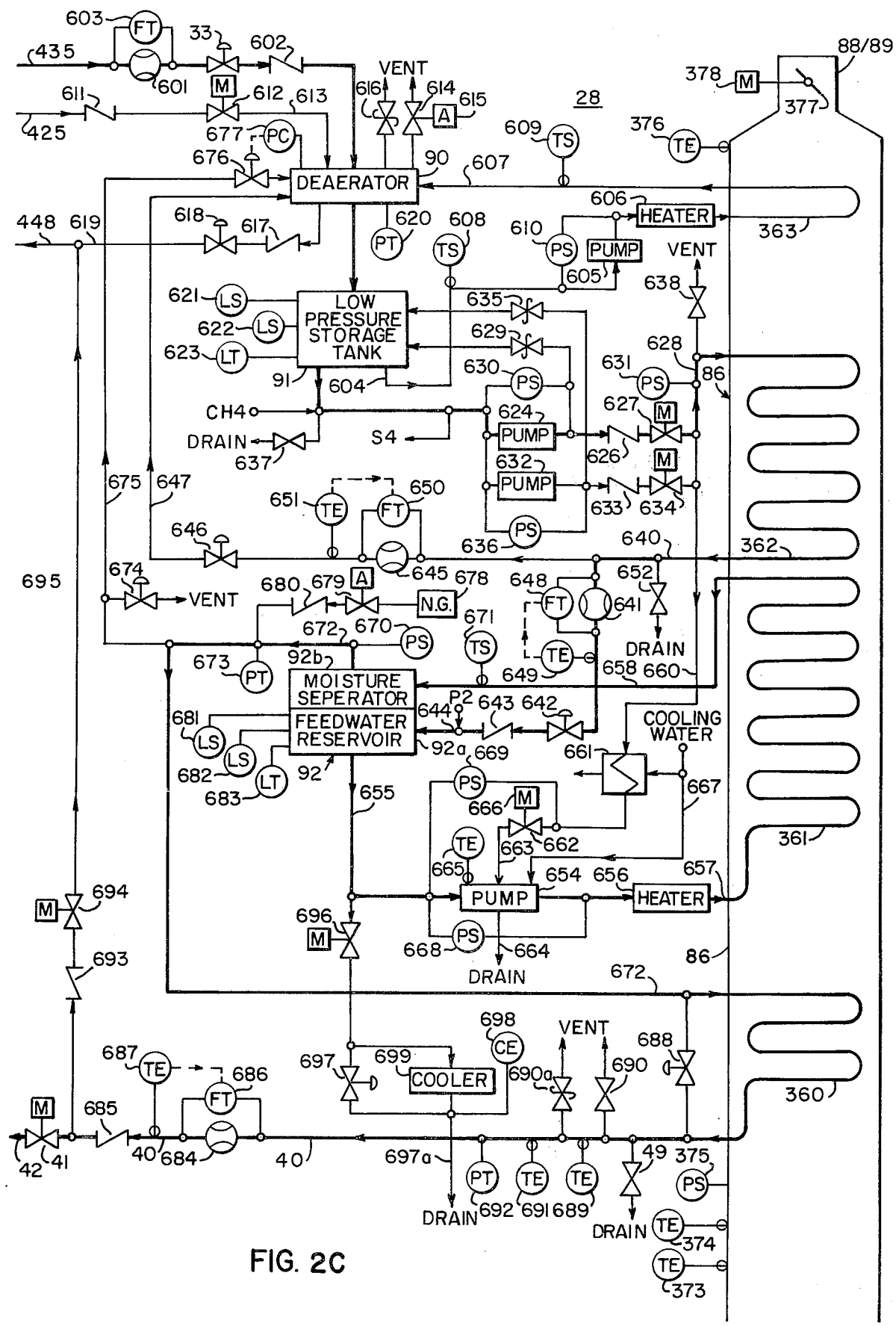
Figure 3:
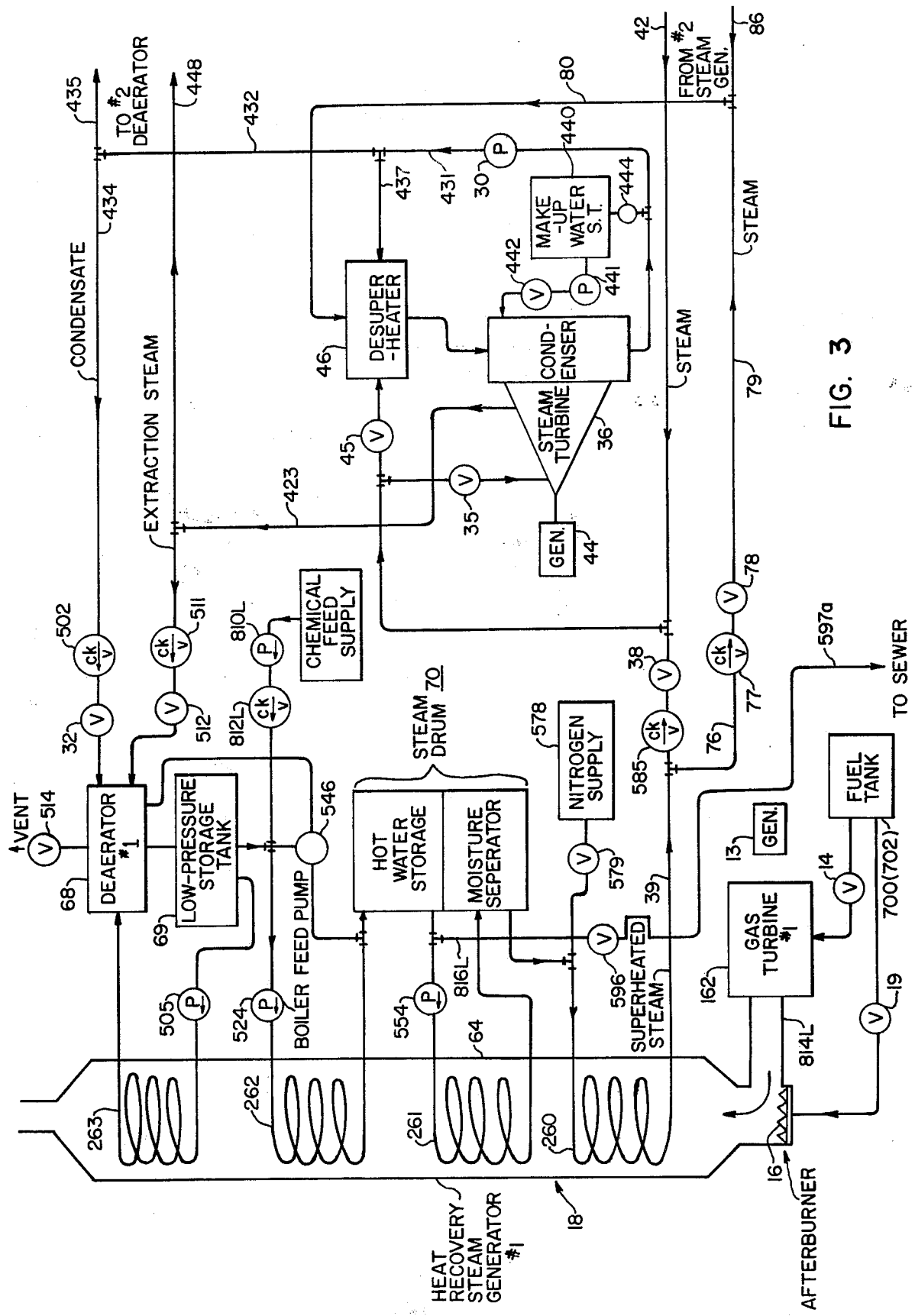
FIG. 3 shows a simplified, diagrammatic form a combined cycle power plant particularly illustrating the inventive features of this invention.

The system, as shown in FIGS. 2A and 2B further includes a steam bypass mechanism associated with each system generator for returning the superheated steam leaving the superheater tubes 260 directly back to the condenser 31 without passing through the steam turbine 36. This bypass mechanism includes steam line 595, check valve 593, bypass control valve 594 and steam lines 447, 449 and 404, the latter running to the desuperheater 46. The bypassed steam is cooled by the desuperheater 65 and returned to the condenser 31. During the normal operation of the system, the bypass valve 594 is closed and no steam is bypassed to the desuperheater 46.

The system, as shown in FIG. 3, also includes a source of a non-corroding fluid such as nitrogen gas, represented by nitrogen supply 578. Such nitrogen can be injected into the steam/condensate system at a point intermediate the moisture separator 70b and the superheater tubes 260 by means of a nitrogen control valve 579. During the normal operation of the system, the nitrogen control valve 579 is closed and no nitrogen is present in the steam/condensate system.

A second gas turbine, steam generator, deaerator, low pressure storage tank and steam drum combination, which is identical in construction to that just considered, is located to the right of the condenser 31 and desuperheater 46, as shown in FIG. 3, and is connected to the illustrated apparatus by way of steam lines and condensate lines 42 and 435. The presence of this second gas turbine/steam generator system need not be discussed in detail except to note that it also includes the same controls as the illustrated system for enabling the second gas turbine to be operated even though the second steam generator is in a dry condition.

Figure 4A:
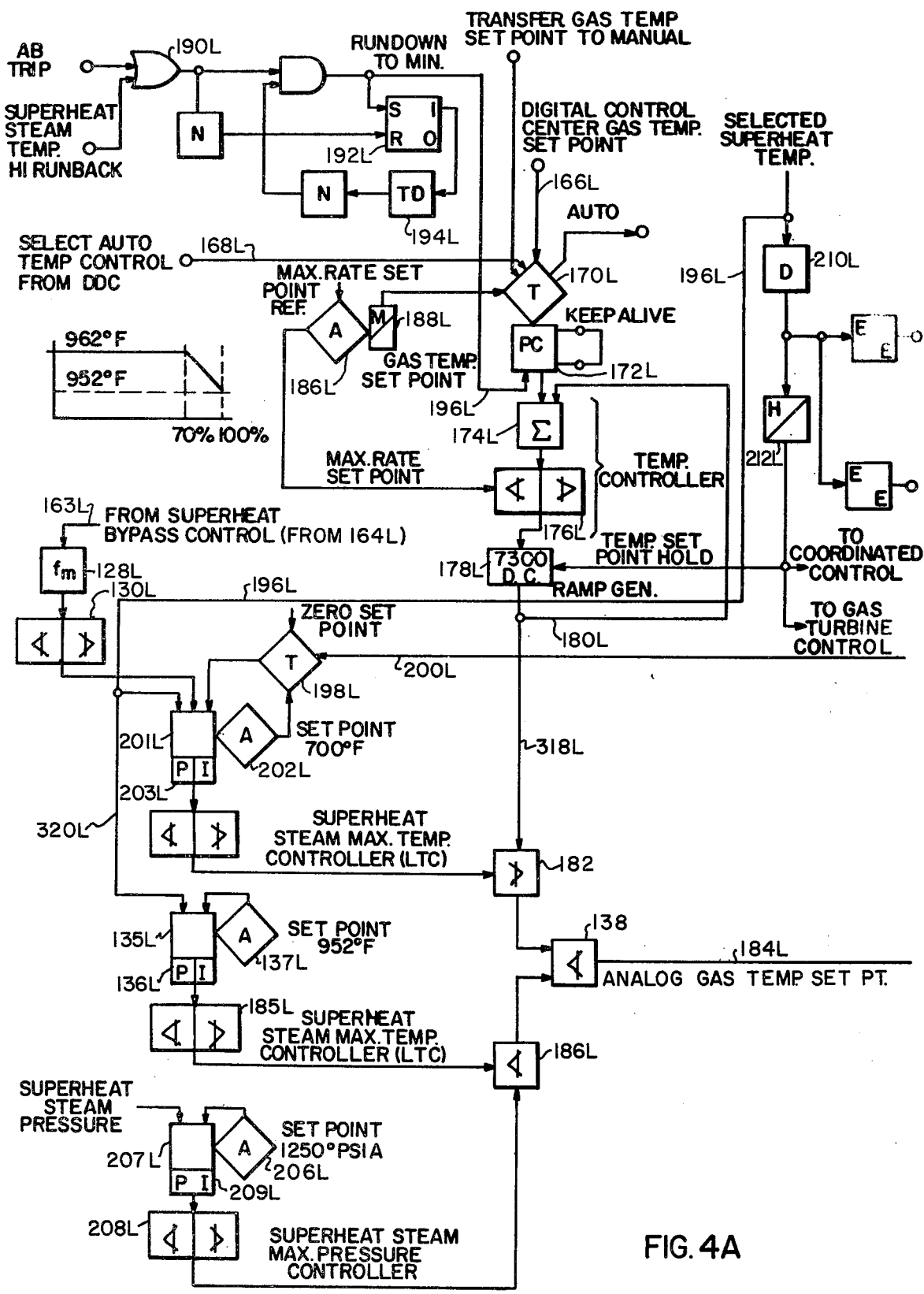
FIGS. 4A and 4B show in a functional diagram a control circuit for regulating the afterburner fuel valve 19 as shown in FIG. 3.
Figure 4B:
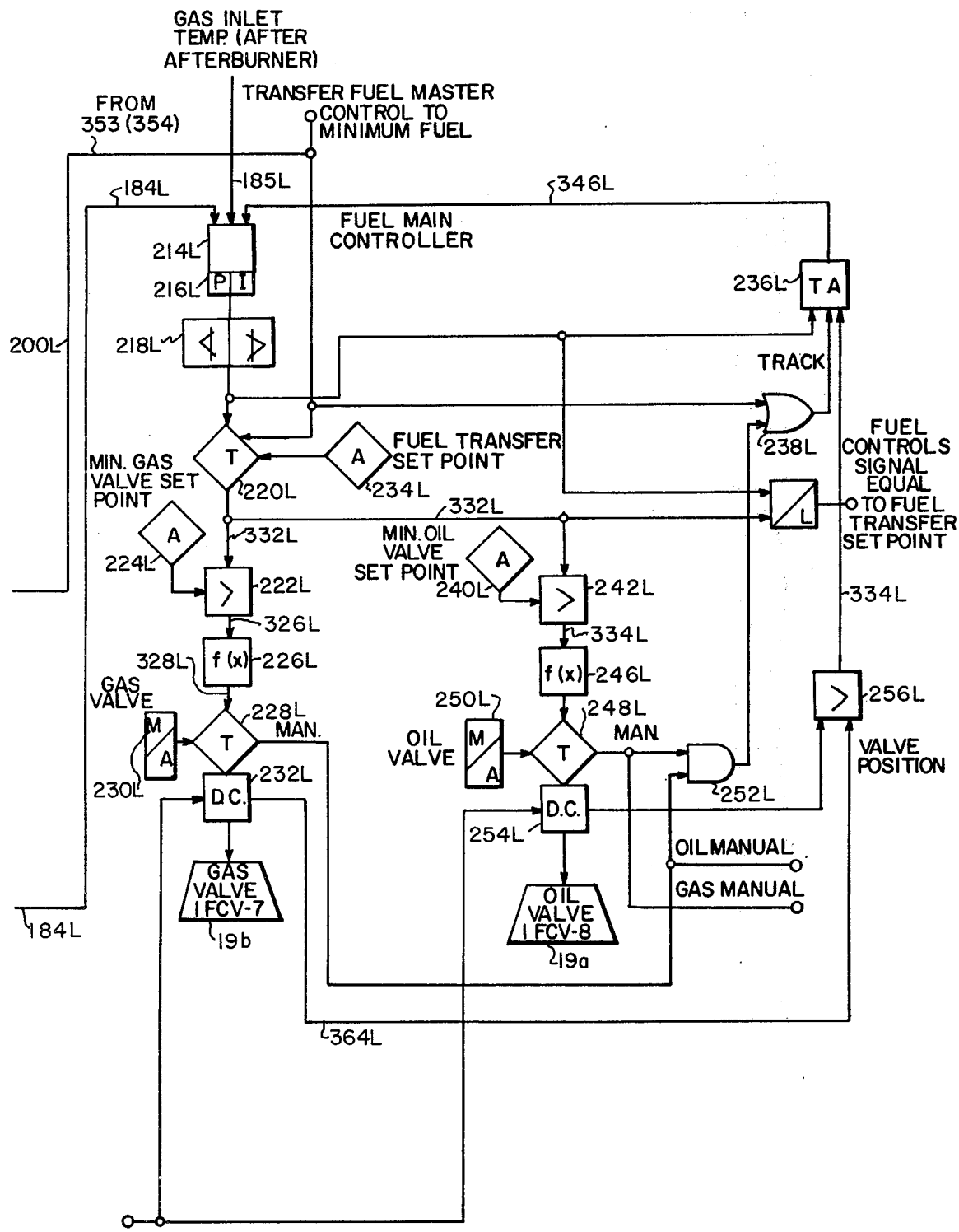

In the event that the heat recovery steam generator 18 must be removed from service, e.g. a tube has ruptured or one of its pipes is leaking, the steam generator 18 may be transferred from a WET mode of operation wherein steam is generated to be supplied to the steam turbine 36, to a DRY mode of operation wherein the gas turbine 162 is operated at less than its maximum rated power, so that the temperature of its exhaust gases as directed to the heat recovery steam generator 18 is reduced below a predetermined maximum level. As will be explained, the initial steps of the transfer process are carried out by the operator from his operator's panel, with subsequent steps being carried out by automatic logic circuitry to protect the heat recovery steam generator 18 from damage and from operator error, e.g. omission of a critical step. First, the operator actuates upon his panel appropriate control whereby the afterburner 16 is shut down and in particular, the fuel valve 19 is disposed to its closed position. As shown in FIG. 4B, fuel is supplied through one of either the gas valve 19b or the oil valve 19a. For example, if the gas valve 19b is supplying fuel to the afterburner 16, the operator enters a command by the manual/auto control block 230L, whereby the associated transfer block 228L is transferred to a MANUAL mode of operation and the closed valve position value is applied to the driver card 232L, whereby the gas valve 19b is disposed to its closed position. It is understood that similar input signals may be entered by manual/auto control 250L, whereby oil valve 19a is closed in a similar manner. Thus, the fuel supply to the afterburner 16 is cut of by the selected valve 19, whereby no supplemental or additional heat is provided to the gas turbine exhaust gases directed to the heat recovery steam generator 18.

Figure 2D:
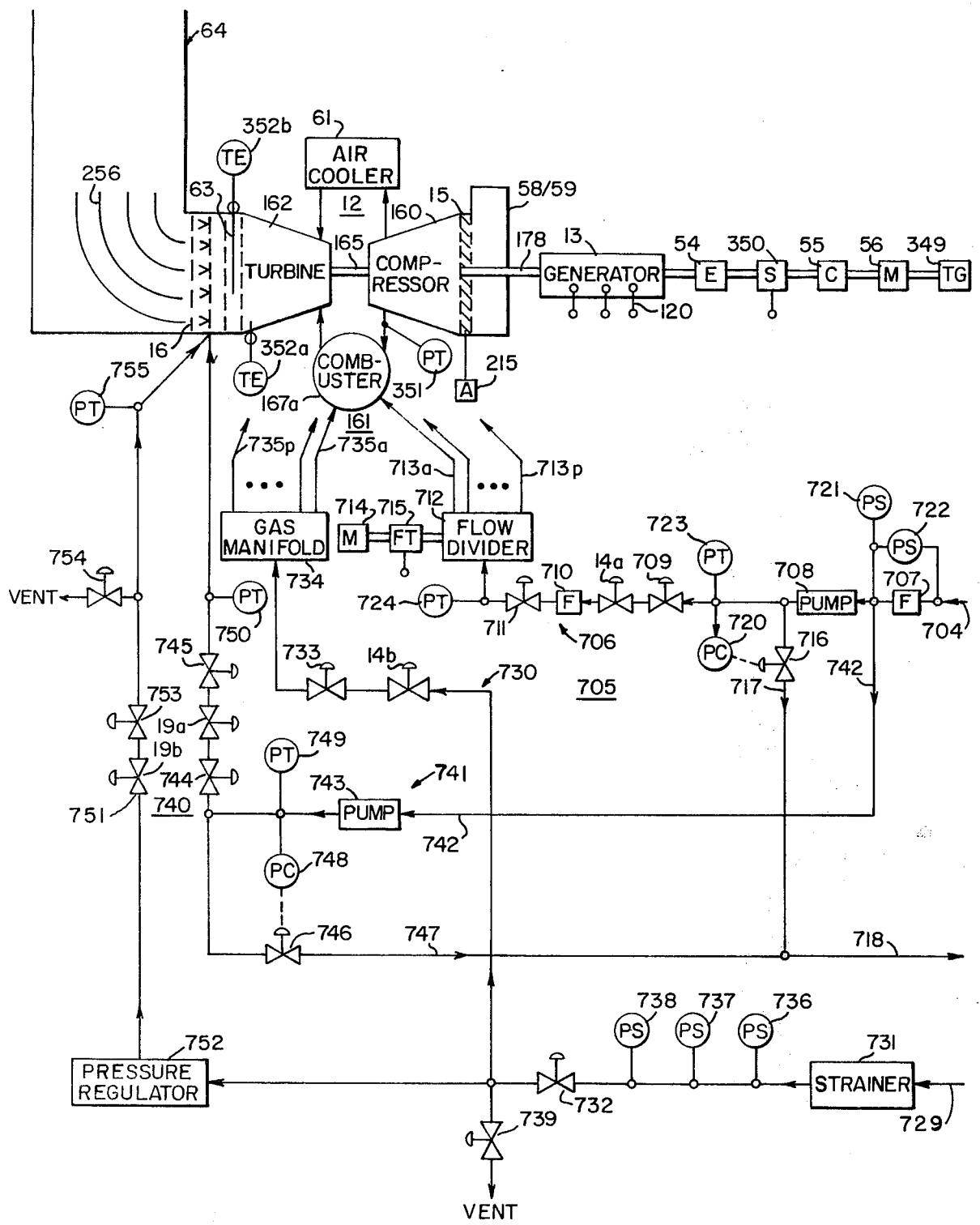
Figure 2E:
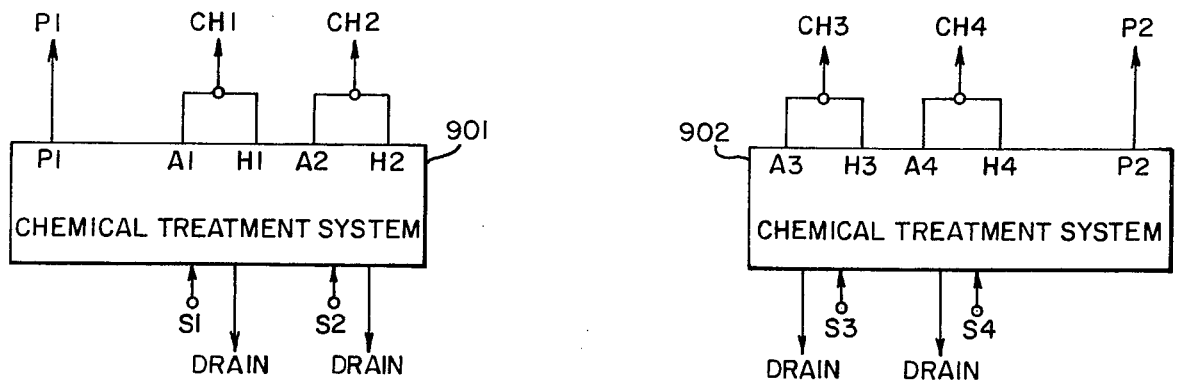
Figure 2E:
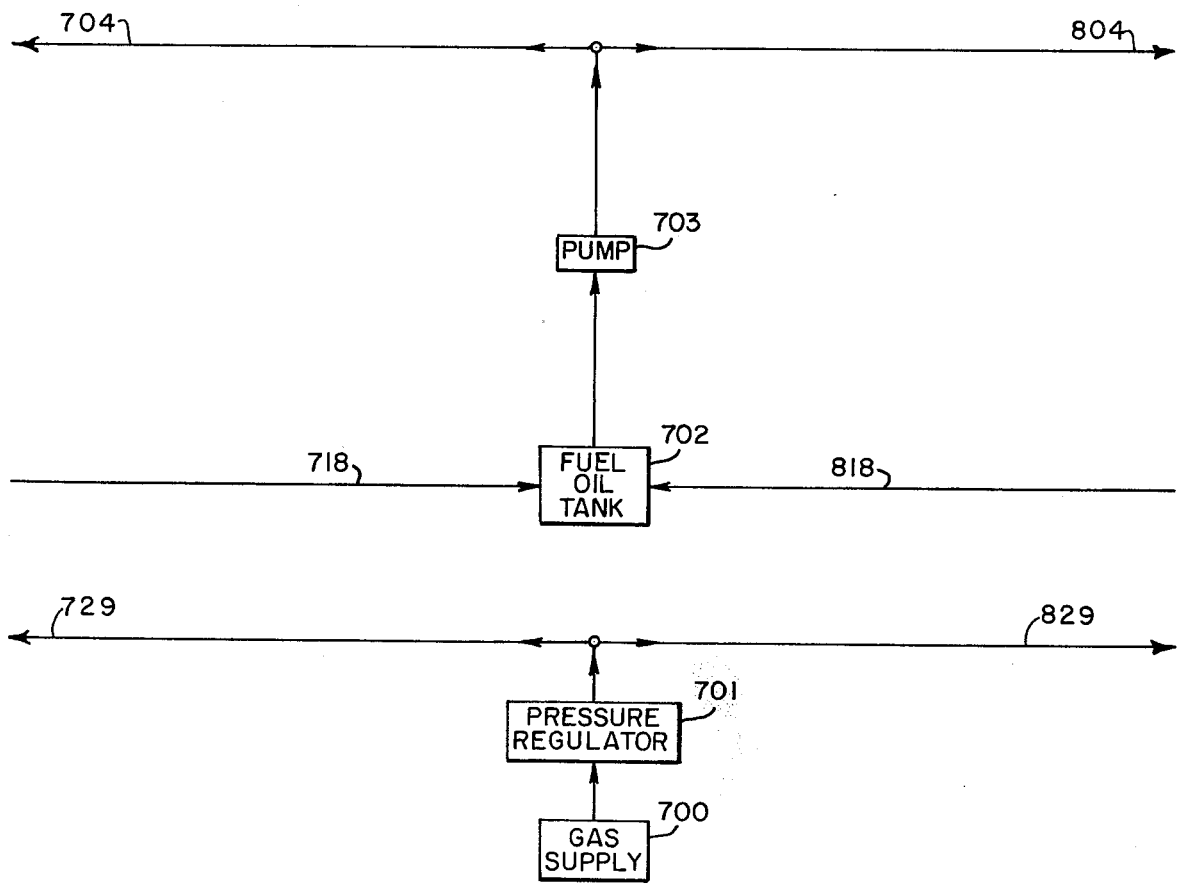
Figures 2F, 2G:
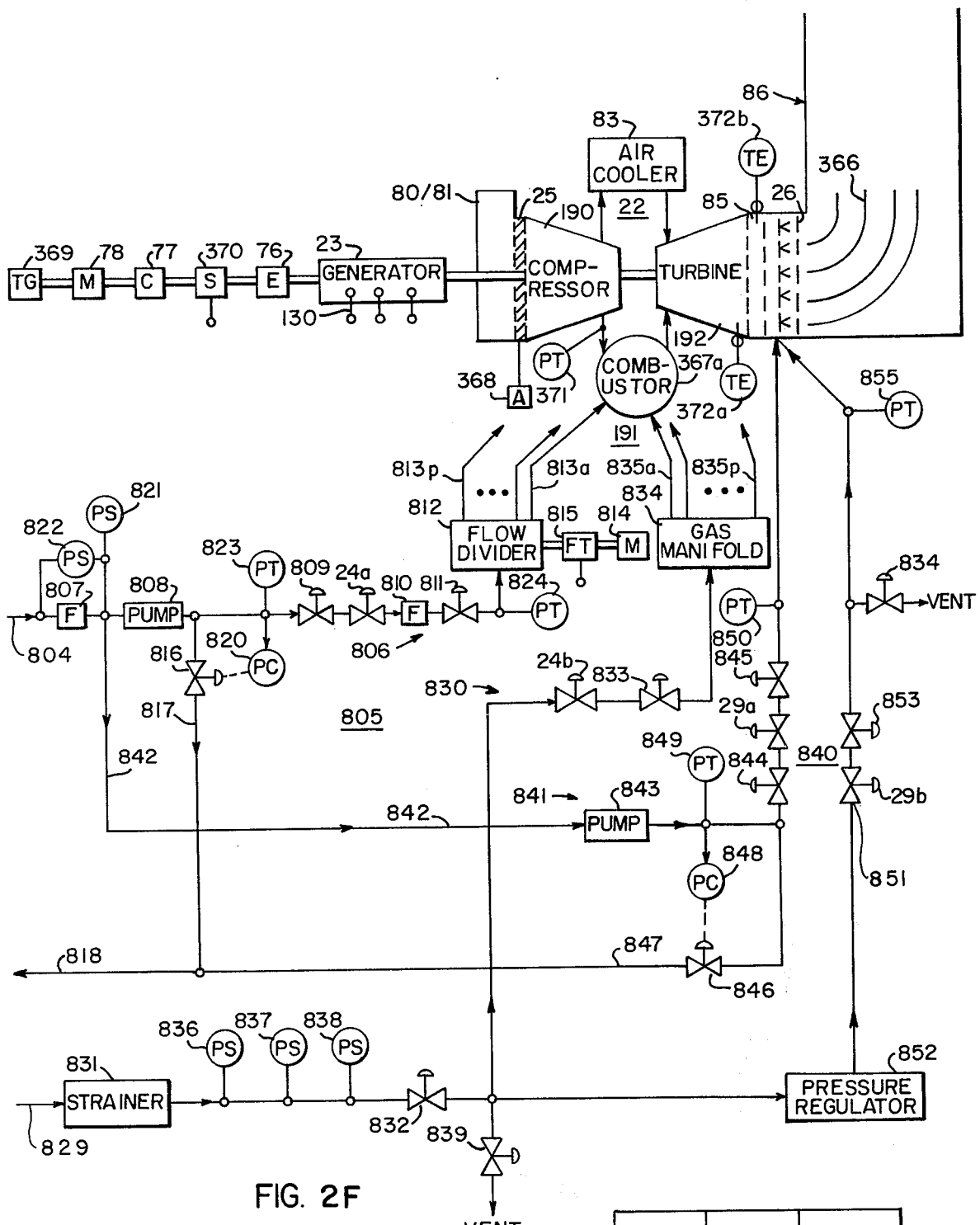

In addition, the operator from his panel reduces the gas turbine load to a point whereby the exhaust gas temperature as taken at the inlet to the steam generator 18 is at or below a maximum, predetermined value permitted for dry, steam generator operation. Illustratively, the fuel supply to the gas turbine 162 is reduced whereby the temperature of its exhaust gases is reduced from approximately 940°F to 900°F. With reference to FIG. 2D, control signals are entered whereby one of the fuel valves 14a or 14b is closed, and the fuel supplied to the gas turbine 162 is reduced to achieve the desired temperature reduction. The maximum dry operation temperature as determined by the fuel supplied to the gas turbine 162, is controlled by balancing the need to generate maximum power in a DRY mode of operation, with the need to optimize the life of the heat exchange tubes 260, 261 and 262. At a maximum temperature limit of 900°F for DRY operation, the steam generator may be operated for 6000 hours without damage.

Figure 10:
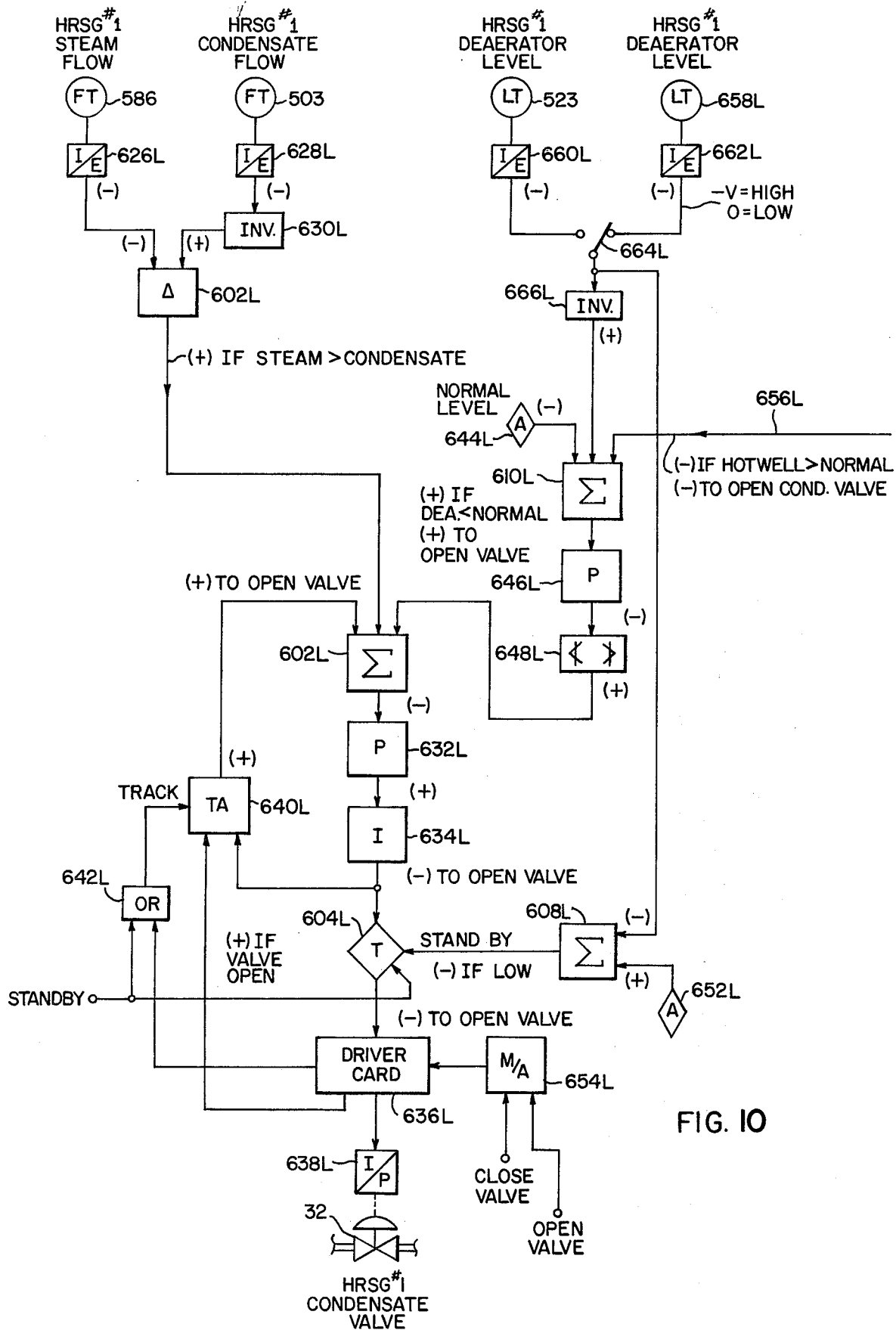
FIG. 10 is a functional diagram of the control for regulating the condensate valve 32 as shown in FIG. 3.
Figure 11:
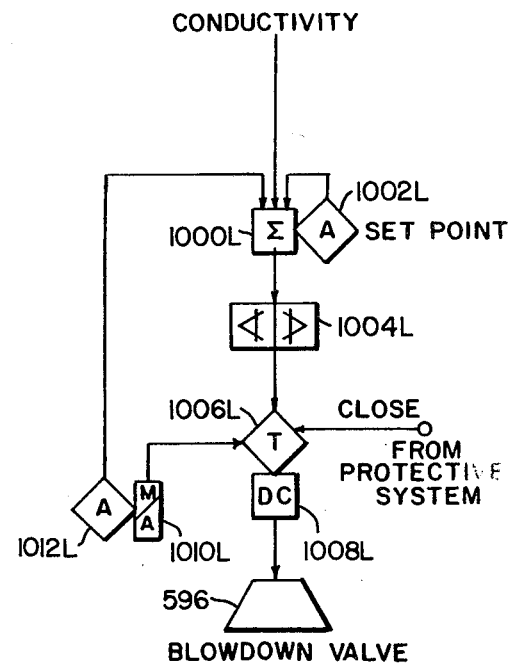
FIG. 11 is a functional diagram of the control for the blow down valve 596 as shown in FIG. 3.

Next, the operator from his panel, shuts down the chemical feed supply 901, by deactuating the chemical supply feed pump 810L and the check valve 812L. Next, as seen in FIG. 10, the operator applies from his panel a closed valve signal to the manual/auto control block 654L, whereby the output of the drive card 636L drives the condensate valve 32 closed. Then, the operator from his panel actuates the manual/auto control block 1010L, as seen in FIG. 11, whereby a closed position signal is applied to the transfer function block 1006L, the drive card 1008L to the blowdown valve 596; thus, valve 596 is opened to permit fluid to drain from the system.

After the flow of condensate to the heat recovery steam generator 18 is cut off, the generator 18, as shown in FIG. B3, continues to generate steam whereby steam continues to be generated and supplied to the steam turbine 36, thus depleting the fluid remaining within the steam generator 18. Further, the blowdown valve 596 is opened whereby fluid is directed through conduit 816L from the steam drum 70, through the open blowdown valve 596 and conduit 597a to the sewer. Thus, the fluid level within the deaerator storage tank 69 and the hot water storage section 70a of the steam drum 70 is lowered. Further, the operator from his panel closes the extraction steam block valve 512 to prevent further steam from being extracted from the steam turbine 36 and supplied to the deaerator 68.

Figure 6A:
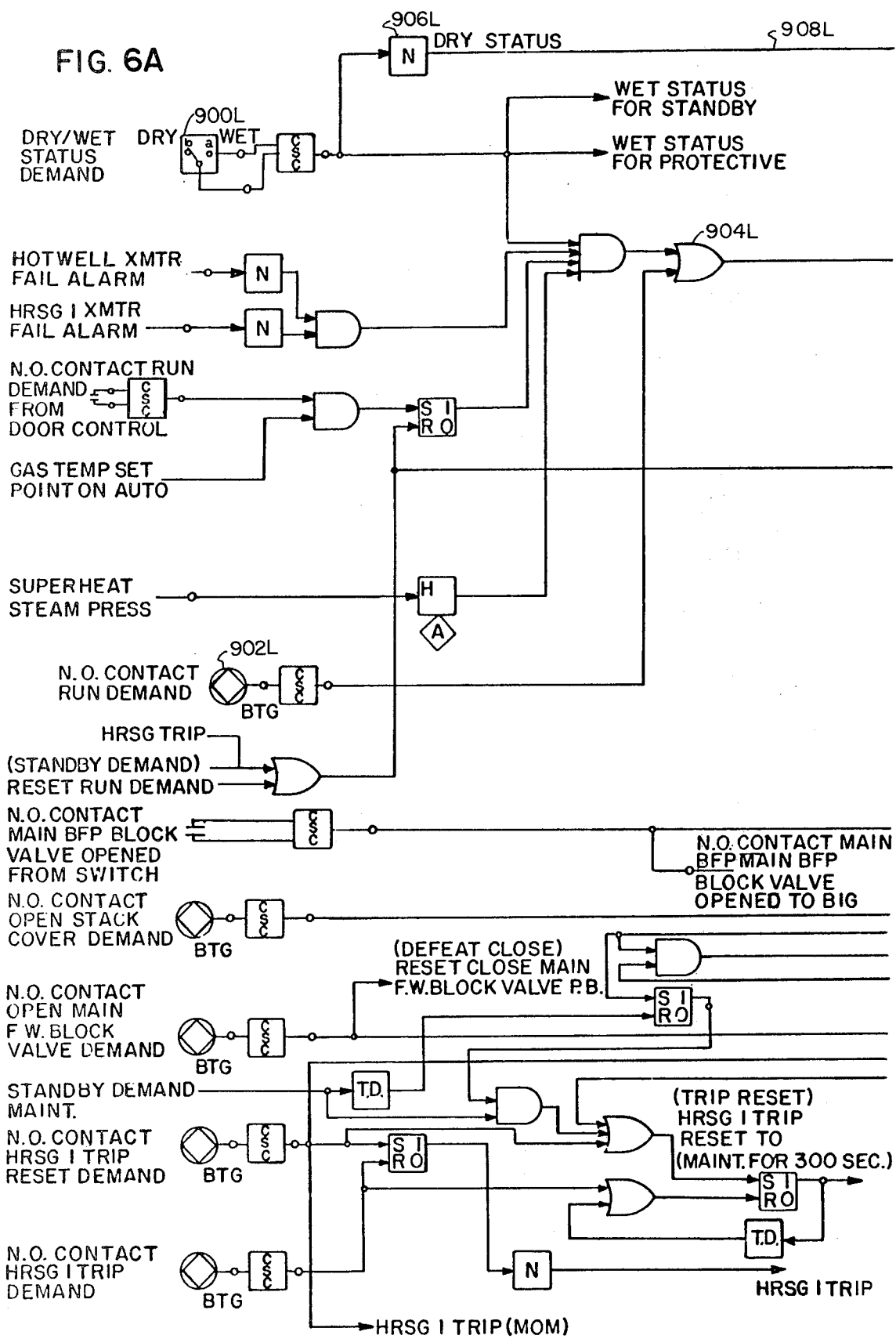
Figure 8B:
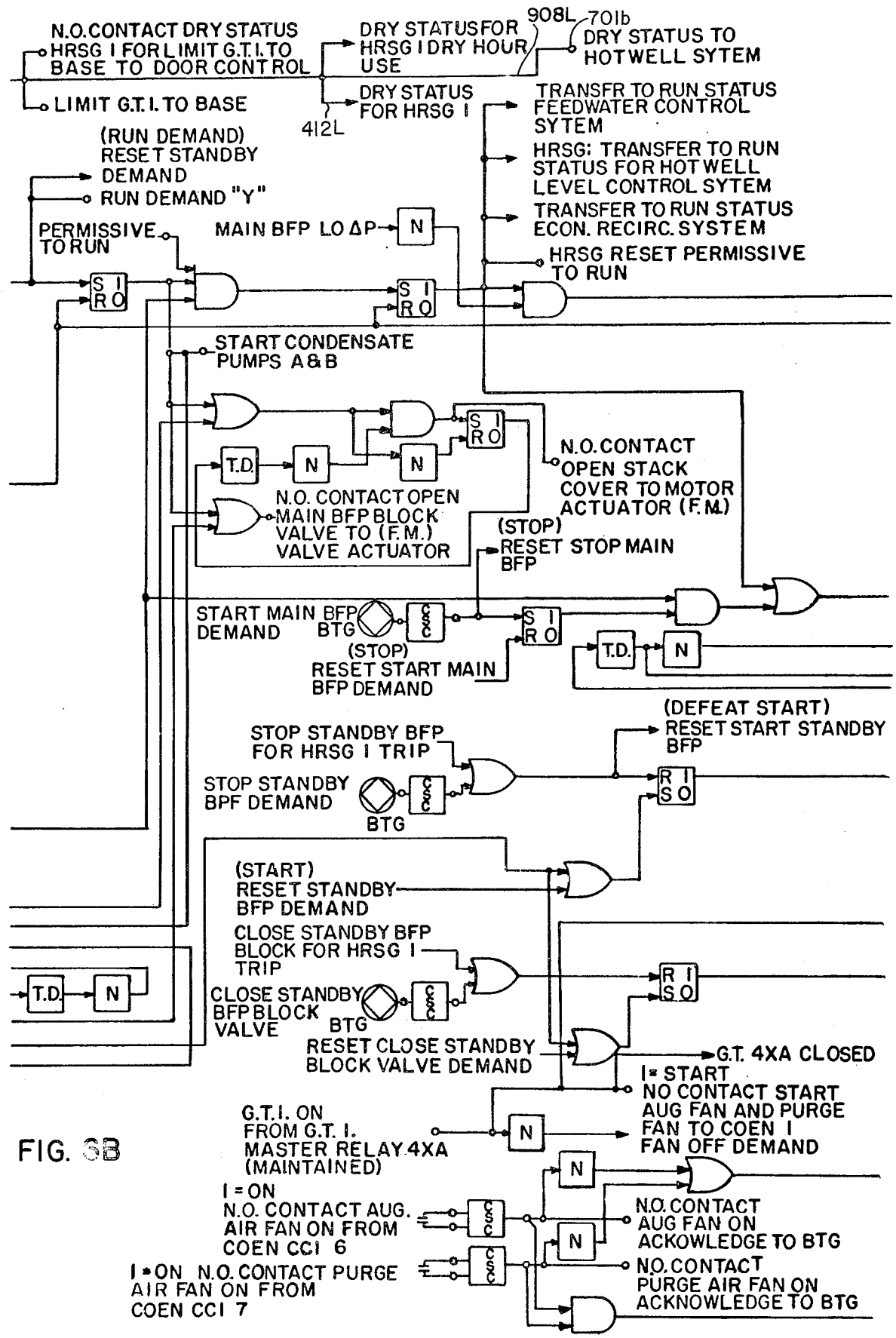
Figure 6C:
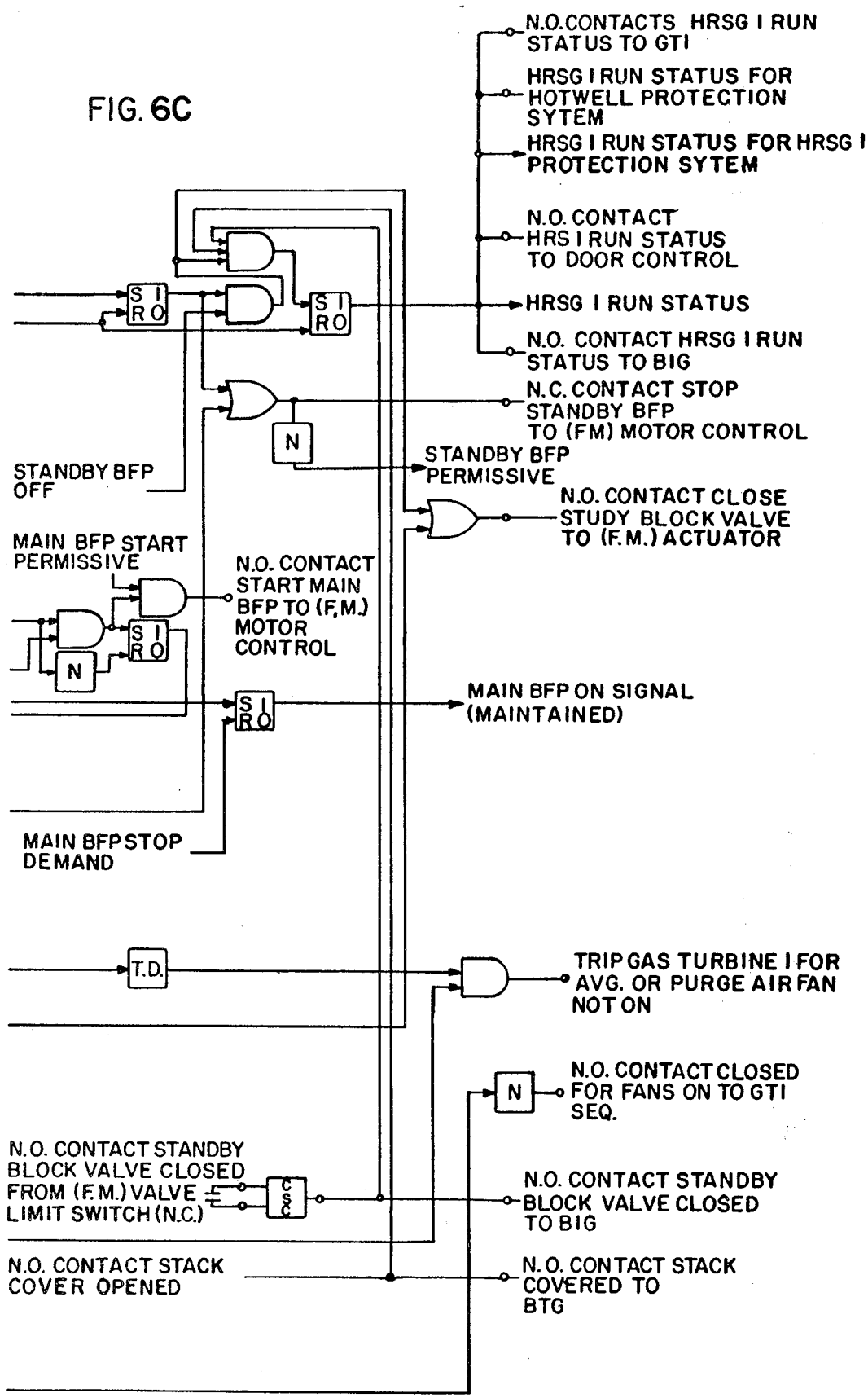

At this point, after the load placed upon the gas turbine 162 has been reduced and the afterburner fuel supply valve 19 closed, the operator initiates DRY operation by actuating the dry/wet switch 900L as seen in FIG. 6A, to its DRY position, whereby the automatic control is activated to protect the heat recovery steam generator 18 by assuming control of the remaining steps of the transfer process and by effecting any steps the operator may have overlooked. Generally, steam is produced in the heat exchange tubes 252, 251 and 260, whereby generated steam is supplied to the steam turbine 36. Thus, as water is pumped from the steam drum 70, water is transferred from the storage tank 69 associated with the deaerator 68 to maintain the fluid level within the hot water storage portion 70a under the control of the drum level controls. The fluid continues to be pumped from the storage tank 69 until a trip point occurs. In particular, when the fluid level within the low pressure storage tank 69 falls below a predetermined low limit level, the level transducer 523 generates a signal indicative thereof, which causes as by the logic control to be described, the low pressure circulating pump 585 and the boiler feed pump 524 to be shut down.

At this time, the high pressure circulating pump 554 continues to run, thus draining water from the hot water storage section 70a, until the fluid level therein reaches a low trip level as indicated by the output of the level transducer (see FIG. 2A) or the seal chamber reaches a maximum temperature, when it shuts down via motor interlocks. The fluid continues to circulate even through the boiler feed pump 524 and the high pressure circulating pump 554 are out of service, due to the natural circulation of the steam. Thus, water continues to drain through the blowdown conduits 816L and 597a. As shown in FIG. 2A, when the steam flow drops below a predetermined flow rate, e.g. 75,000/pph, as indicated by the output of the flow transducer 586, the bypass valve 594 automatically opens, thus permitting the remaining fluid to be directed by way of conduits 595, 447, 449 and 404, and the desuperheater 46 to the condenser 31. At this time, the operator closes the main steam stop valve 38.

The fluid continues to be extracted from the steam generator 18 and either drained through the blowdown conduits 816L and 597a to the sewer or passed directly through the desuperheater 46 to the condenser 31. When the pressure within the steam generator 18 reaches 5 PSIG, the operator closes the blowdown valve 596 and the deaerator vent 514, and if already not performed, the operator opens the nitrogen block valve 579, whereby nitrogen is introduced into the heat exchange tubes 260, 261 and 262 of the steam generator 18 to prevent the introduction of oxygen, which would cause possible rusting and corrosion. At this point, the steam generator 18 is considered dry and as the pressure of steam falls, the nitrogen gas is permitted to diffuse throughout the steam generator 18.

FUNCTIONAL DESCRIPTION OF TRANSFER LOGIC CONTROL

To initiate the automatic transfer logic control, the operator actuates the dry/wet switch 900L as seen in FIG. 6A, to generate a dry demand signal. As long as the steam generator 18 continues to operate to generate steam, a run status signal is applied through contact 902L and OR gate 904L. Upon being actuated to dry, the switch 900L applies a dry status signal through the inverting circuit 906L and conductor 908L to a terminal 910L (see FIG. 6B). The output derived from terminal 910L is applied to the hot well protective system and defeats all trip signals derived therefrom. Thus, as long as a dry status signal is developed, no trip signals may be derived from the hot well protective system. Further, the output derived from the terminal 910L is applied to a manual/auto control 654L whereby the condensate valve 32 is closed. At this point, the transfer from a WET to a DRY mode of operation continues with the fluid being boiled down either through the blowdown drain or being directed to the steam turbine 36.

Figure 5A:
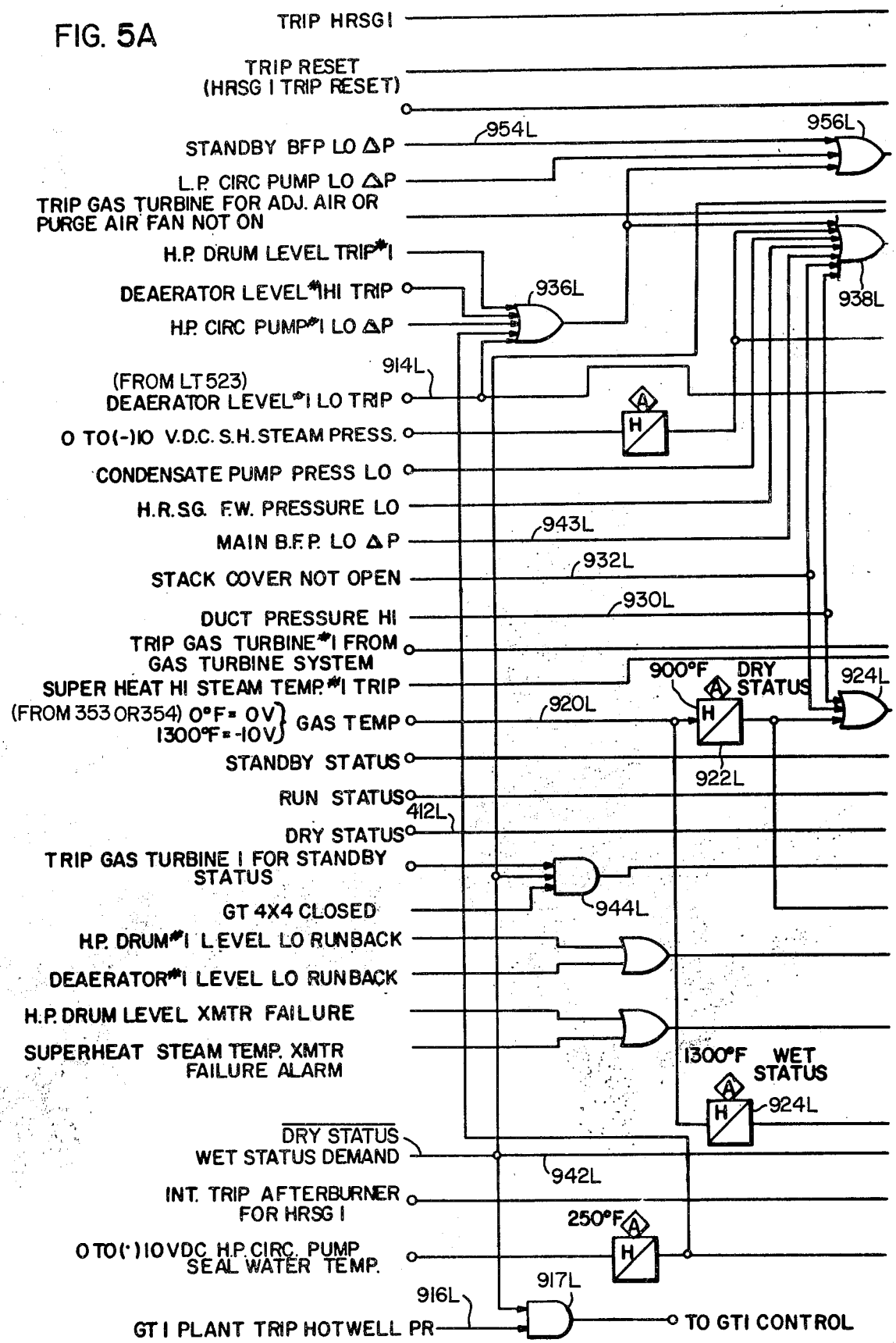
Figure 5B:
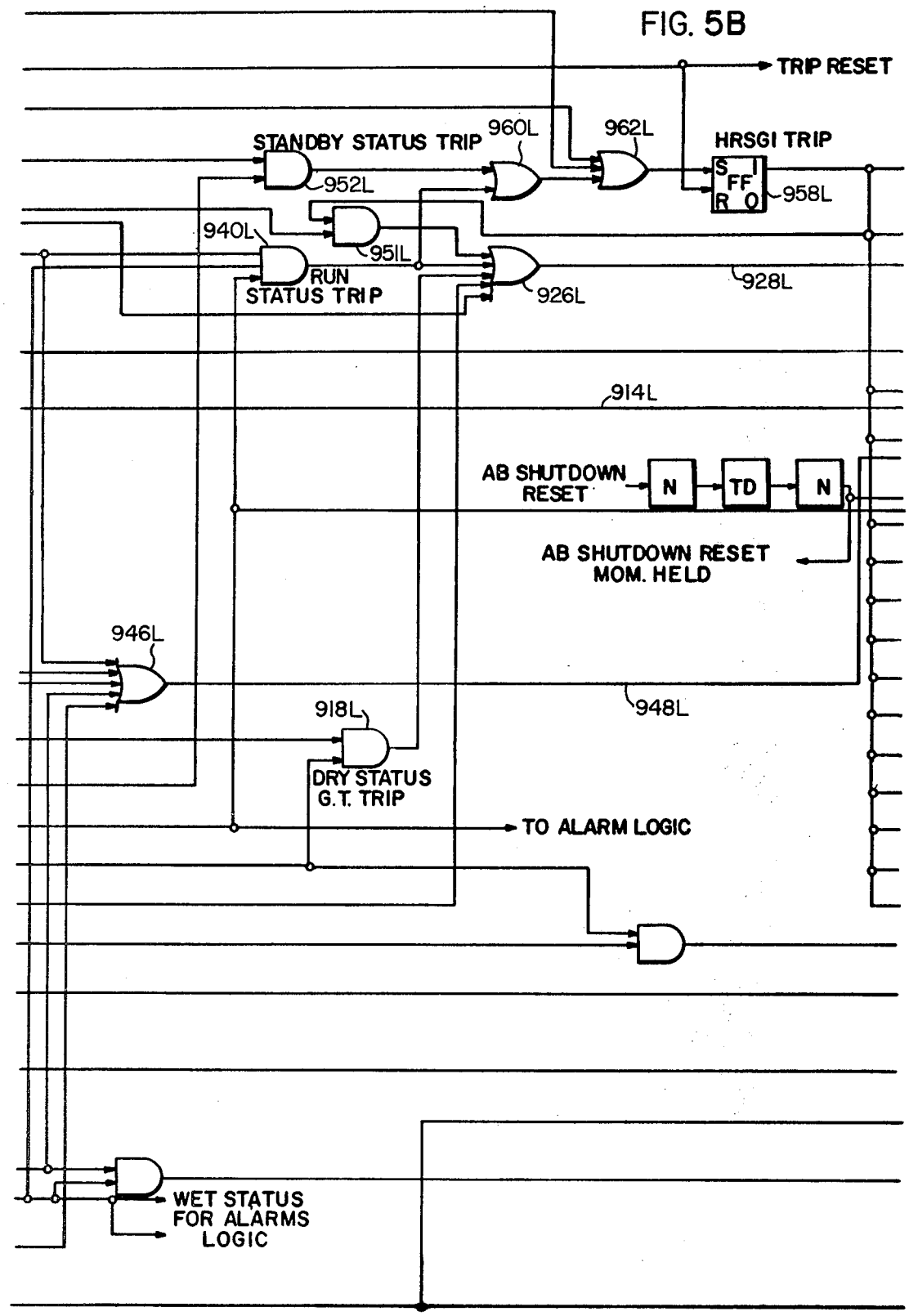
Figure 5C:
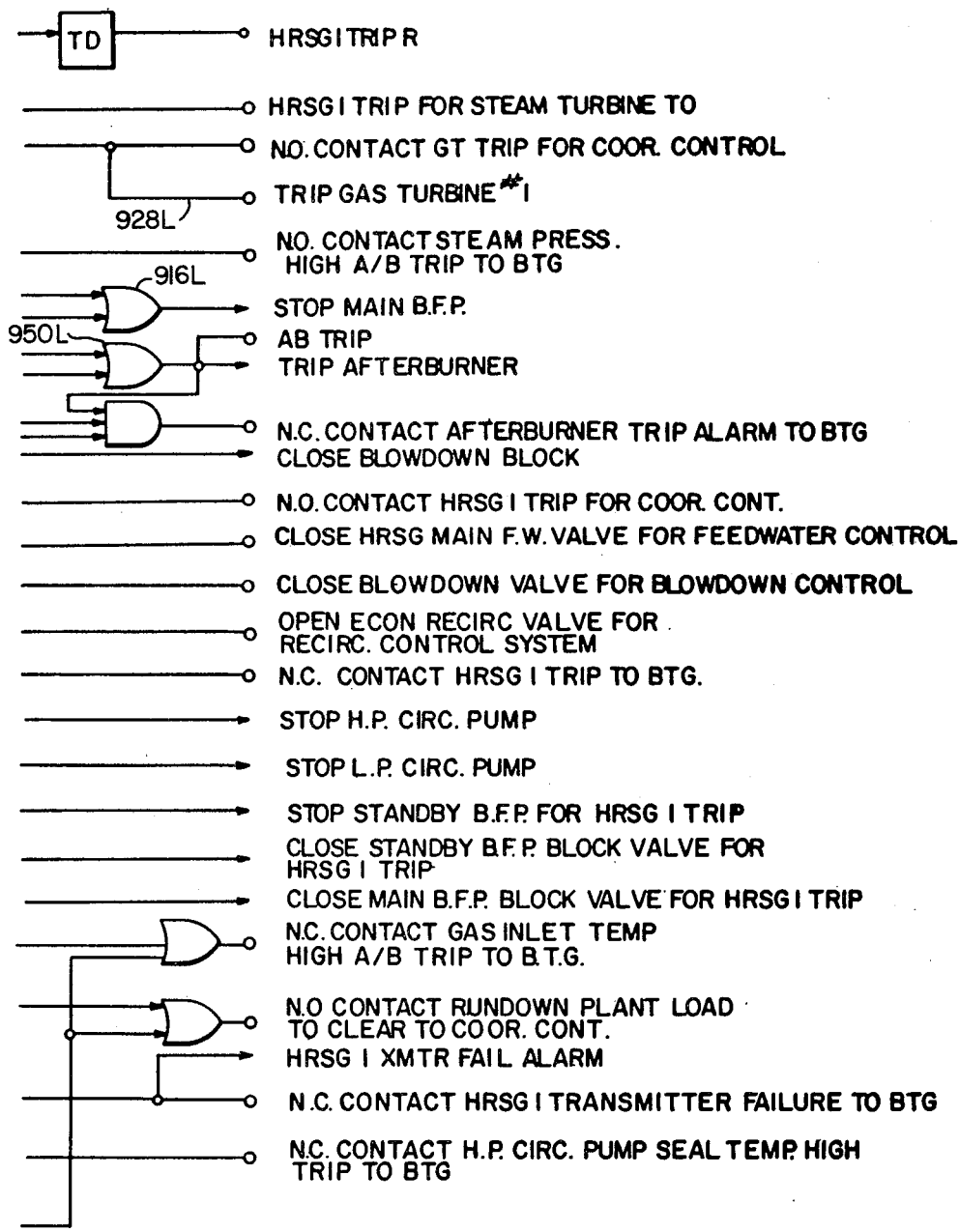

The dry status signal derived from the terminal 910L is applied to the connector 412L as seen in FIG. 5A to set up the dry deaerator trip by enabling an AND gate 918L (see FIG. 5B). Thus, if the temperature of the gas turbine exhaust gases received by the afterburner 18, as measured by the transducer 353 or 354, exceeds a predetermined level, e.g. 900°F, a dry status gas turbine trip is developed from the output of the AND gate 918L and applied to OR gate 926L, which provides by connector 928L a gas turbine trip signal to the gas turbine 162, as seen in FIG. 5C. In particular, the temperature indicating signal as derived from the transducer 353 or 354 is applied to a comparator (see FIG. 5A), which provides an output if the temperature exceeds the dry status limit of 900°F. Thus, if the transfer logic control is in its dry status mode and the temperature of the gas turbine exhaust gases exceeds 900°F, a gas turbine trip signal will be developed and the associated gas turbine 162 will be shut down.

With regard to FIG. 5A, it can be seen that there are only three conditions under which the gas turbine 162 may be tripped, when the steam generator 18 is operated in its DRY mode. As a result, most of the trip signals developed during the WET mode of operation, are inhibited, and only indications that the gas temperature in excess of 900°F, that the stack cover 357 (see FIG. 2A) is not fully opened and that there is a high pressure within the duct leading into the steam generator 18, are permitted to generate a gas turbine trip, whereby the gas turbine 162 is taken out of service. In particular, a switch (not shown) associated with the motor 358 (see FIG. 2A) indicates that the stack cover 357 is not fully open, by applying a signal along conductor 932L to the OR gate 924L, whose output in turn is applied to the AND gate 918L, which, being previously enabled, generates a dry status gas turbine trip. Similarly, the pressure within the afterburner duct is measured by the pressure sensor 355, which, if the pressure is above a predetermined level, applies a corresponding signal along conductor 930L through the NOR gate 924L to cause AND gate (see FIG. 5B) to generate a dry status gas turbine trip signal. Thus, in the DRY mode of operation, the gas turbine continues to operate at temperatures below 900°F with only a minimum number of conditions, as enumerated above, which may initiate a gas turbine trip to take the gas turbine 162 out of service.

When operating in a dry status, most of the inputs as seen in FIG. 5A are inhibited from being applied to trip the gas turbine. This is effected in part by the absence of a wet status demand signal ($\overline{\text{dry status}}$) which is applied to the AND gate 917L, to the AND gate 944L and to the AND 940L (see FIG. 5B). In the wet status, the aforementioned AND gates are enabled to permit the developed trip signals to be applied; however, in a dry status, the AND gates 917L, 944L and 940L are disabled, whereby the corresponding inputs are inhibited. For example, in the DRY mode, the AND gate 917L is disabled and the plant trip hot well signal as applied to connector 916L may not be applied to the gas turbine control. In general, those conditions that would be developed in either a dry status or a standby status are disabled from being applied through the OR gate 926L (see FIG. 3B) to provide a trip gas turbine signal.

Even with the condensate valve 32 closed, there is still heat within the steam generator 18, and the feedwater pump 524 and the high pressure recirculation pump 554 are still in operation serving to circulate water through the heat exchange tubes. This operation continues until the water level within the storage tank 69 associated with the deaerator 68 falls to a level as detected by the level transducer 523 (see FIG. 2A), which then generates and applies a fluid level trip, as shown in FIGS. 5A, B and C, by connector 914L through an OR gate 916L to stop the main boiler feed pump 524. Thus, fluid is no longer fed from the low pressure storage tank 69, which if continued, would cause suction to break upon the boiler feed pump 524, thus possibly damaging it.

Further, as the fluid pressure within the system drops and in particular that pressure as measured across the boiler feedwater pump 524 by the pressure sensor 530 (see FIG. 2A), falls below a predetermined level, the output of the pressure sensor 530 is applied by way of connector 943L, OR gate 938L, OR gate 946L, connector 948L, and OR gate 950L (see FIGS. 5A, 5B and 5C) to develop an afterburner trip. In particular, the afterburner trip serves to close either of the fuel valves 19a or 19b associated with the afterburner 18 (see FIG. 2D), whereby the afterburner is turned off and no additional heat is supplied to the exhaust gas turbine gases.

Finally, when all pumps have been deactuated, the operator from his panel causes a heat recovery steam generator trip to be applied by way of OR gate 926L to set a flip-flop 958L, whose output is applied to close down the remaining portions of the system if not already taken from service, as seen in FIG. 5C. Significantly, the trip signal is applied to the main boiler feed pump 554, the main feedwater valve 542, the closedown valve 596, the high and low pressure circulation pumps 554 and 505, the standby boiler feedwater pump 532, the standby boiler feedwater pump block valve 533 and the main feedwater block valve 527. At this time, typically the operator has disposed the nitrogen feed valve open whereby when the pressure of the stream within the tubes falls below 5 PSIG, and nitrogen is introduced into the heat exchange tubes.

System Circuitry

Figure 7B:
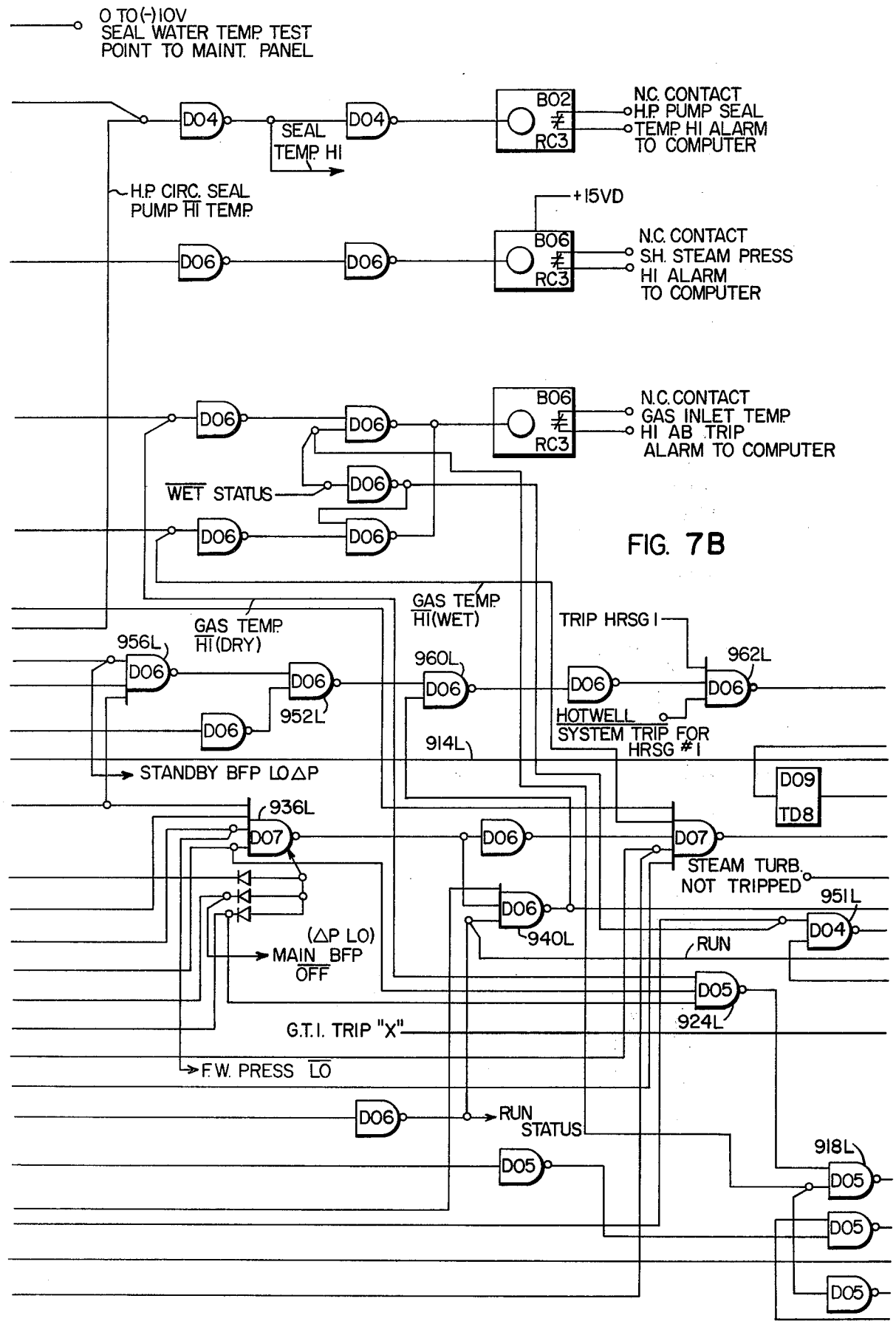
Figure 8A:
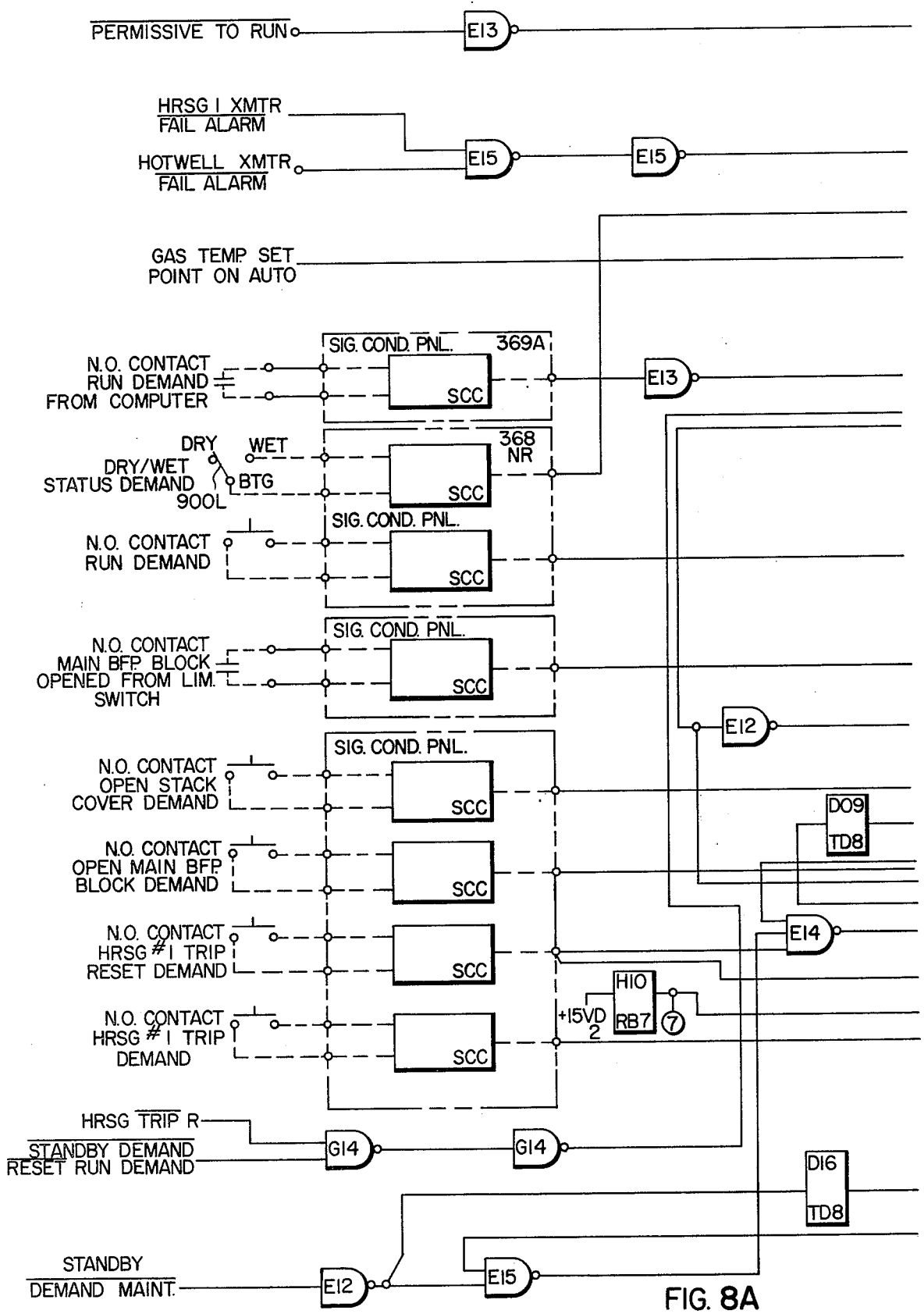
Figure 8B:
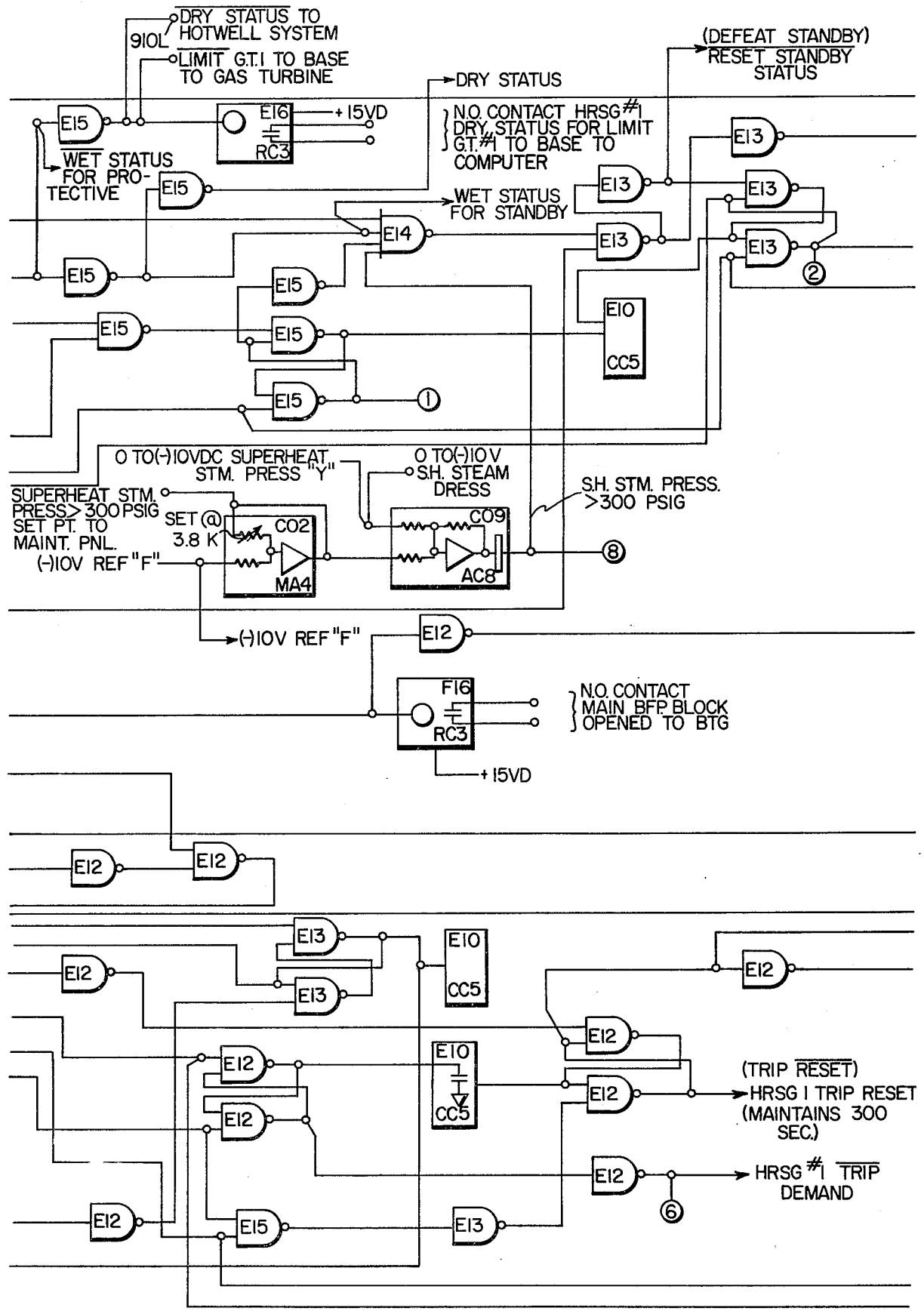
Figure 8C:
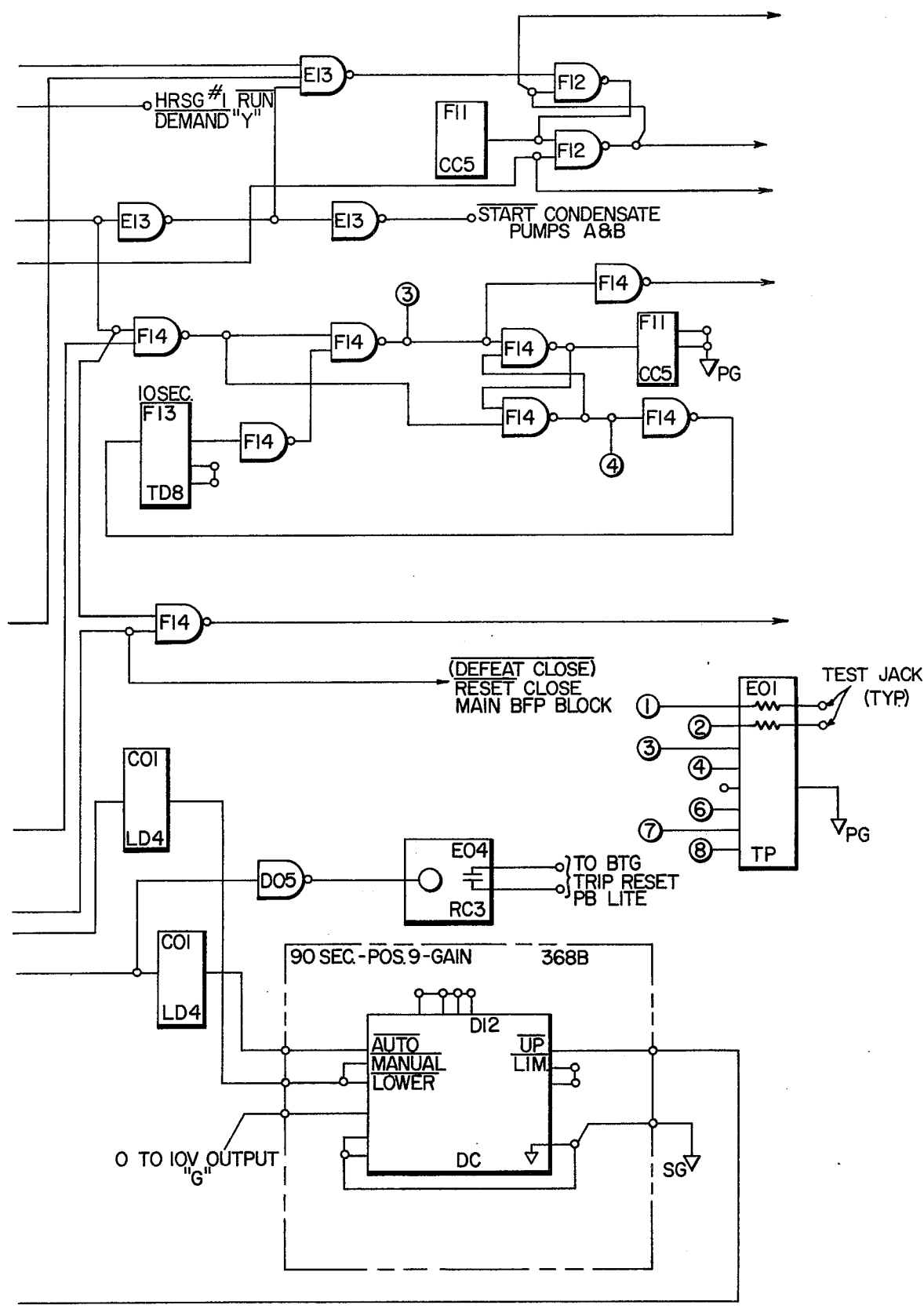
Figure 9A:
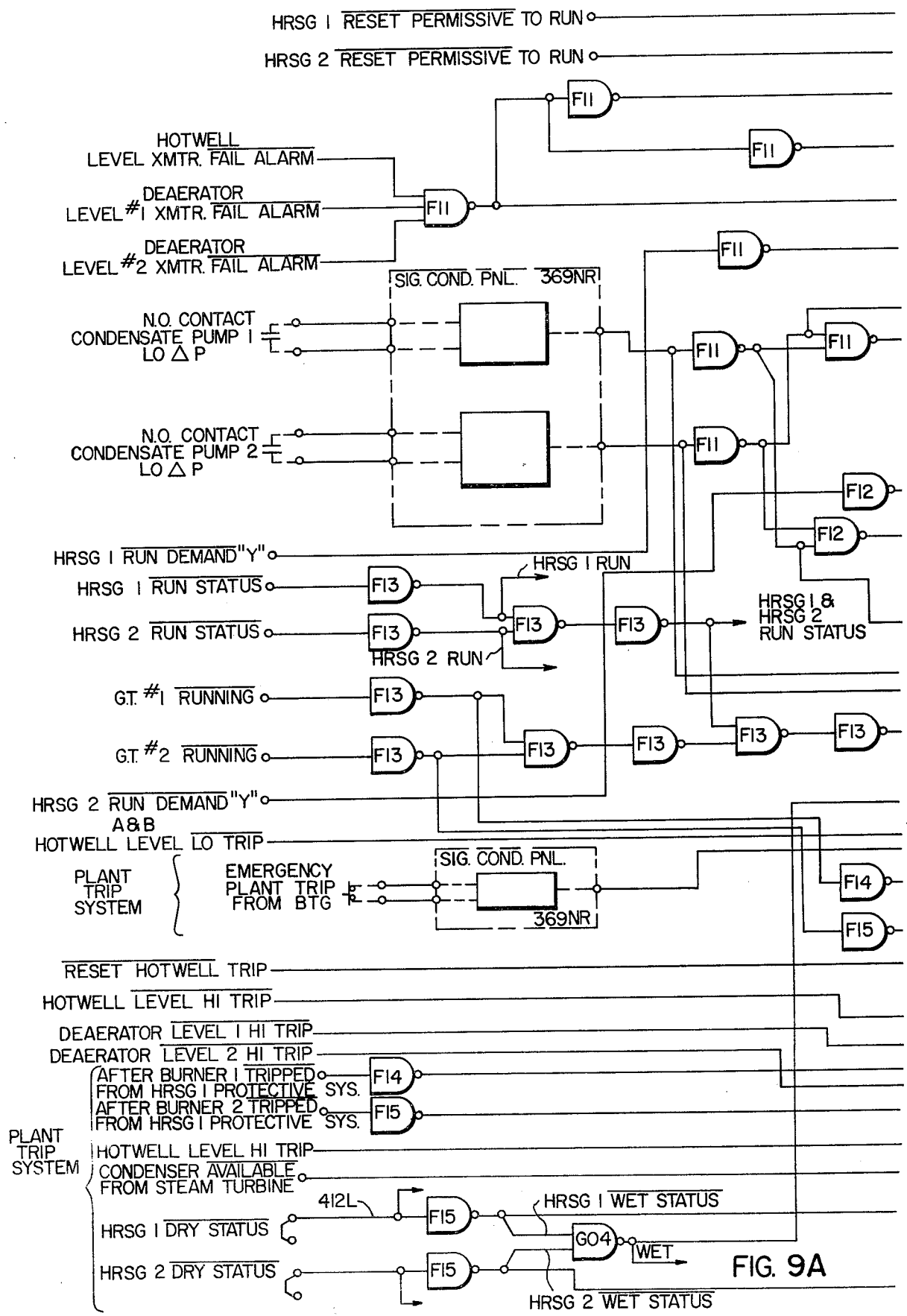
Figure 9B:
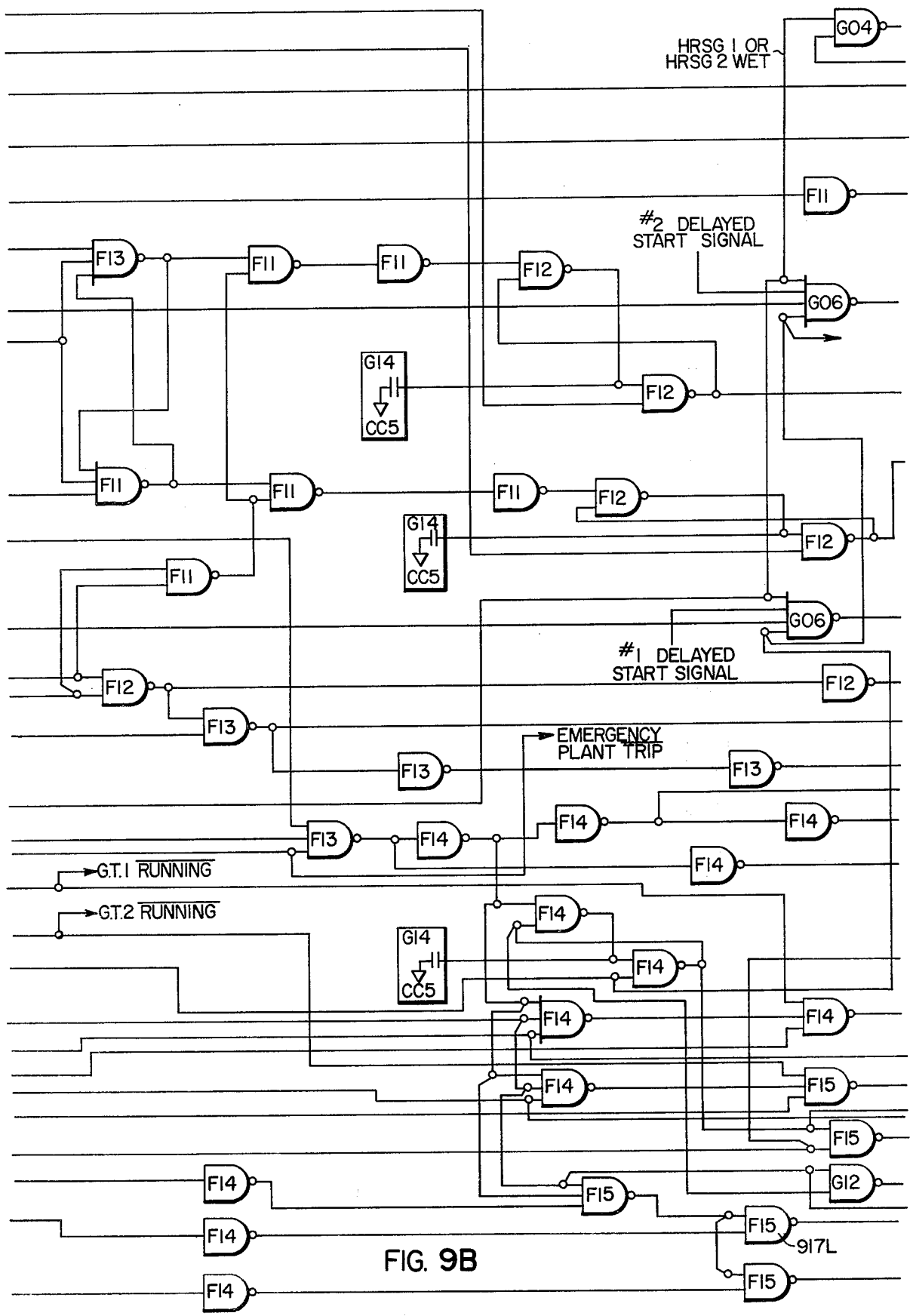
Figure 9C:
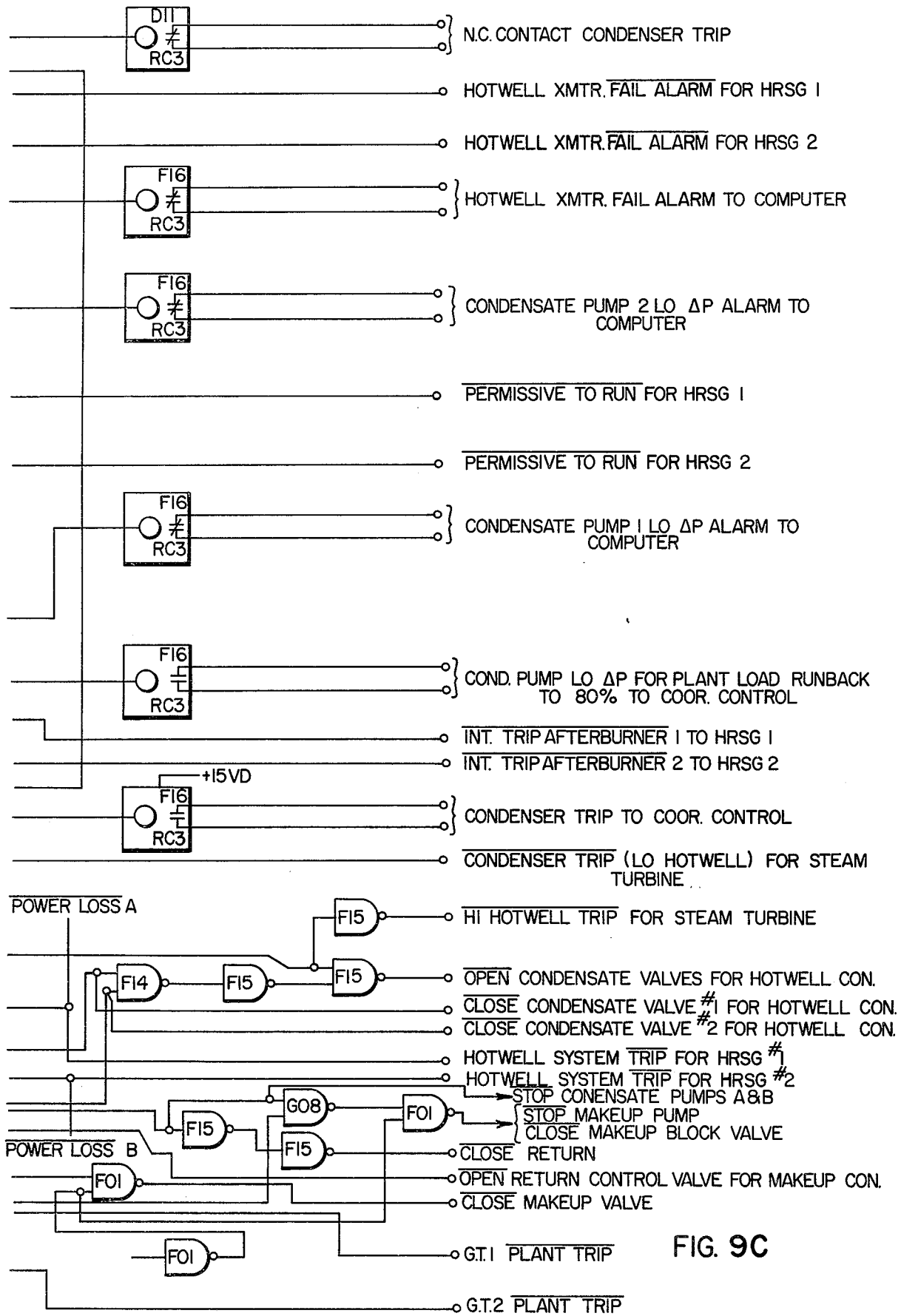

In FIGS. 7A, B and C; 8A, B and C; and 9A, B and C, there is shown detailed circuitry preferably employed to implement the functions described in connection with FIGS. 5A, B and C, and 6A, B and C. As shown in FIG. 8A, the dry/wet switch 900L is disposed to its dry position, whereby a dry status signal is applied to terminal 910L. As seen in FIGS. 9A, B and C, the dry status signal is applied to the conductor 412 whereby the AND gate 917L is disabled, thus preventing when the steam generator control is disposed in a DRY status mode of operation, its output from tripping the first, corresponding gas turbine 162. With regard to FIGS. 7A, B and C, there is shown the particular circuitry by which a limited number of alarm conditions are permitted to set the gas turbine trip, when the steam generator control is being operated in a DRY mode. In particular, the "stack cover not open" signal indicating that the stack cover 357 (see FIG. 2A) is not fully open, is applied upon connector 932L to a first input of the OR gate 924L, whereas a high duct pressure signal derived from the pressure sensor 355 is applied by connector 930L to a second input of the NOR gate 924L. Further, the temperature sensor 953 (or 954) develops a signal indicative of the temperature of the exhaust gas turbine gases as heated by the afterburner 16, to be applied to the comparator circuit 922L which compares the input signal with a reference signal indicative of a temperature of 900°F, whereby an output therefrom is supplied if the exhaust turbine gas temperature exceeds 900°F. The output of circuit 922L is applied to the third input of the OR gate 924L. In turn, upon sensing of any of the three aforementioned conditions, an output is derived from the OR gate 924L and is applied to the AND gate 918L.

A $\overline{\text{wet status}}$ signal is developed indicating that the steam generator control is being operated in its DRY mode and is applied to the other input of the AND gate 918L, thereby enabling the AND gate 918L. Thus, when in a DRY mode and one of the above conditions is sensed, a gas turbine trip signal is developed and applied by way of OR gate 926L and conductor 928L to cause the gas turbine 162 to be taken out of service.

Figure 7C:
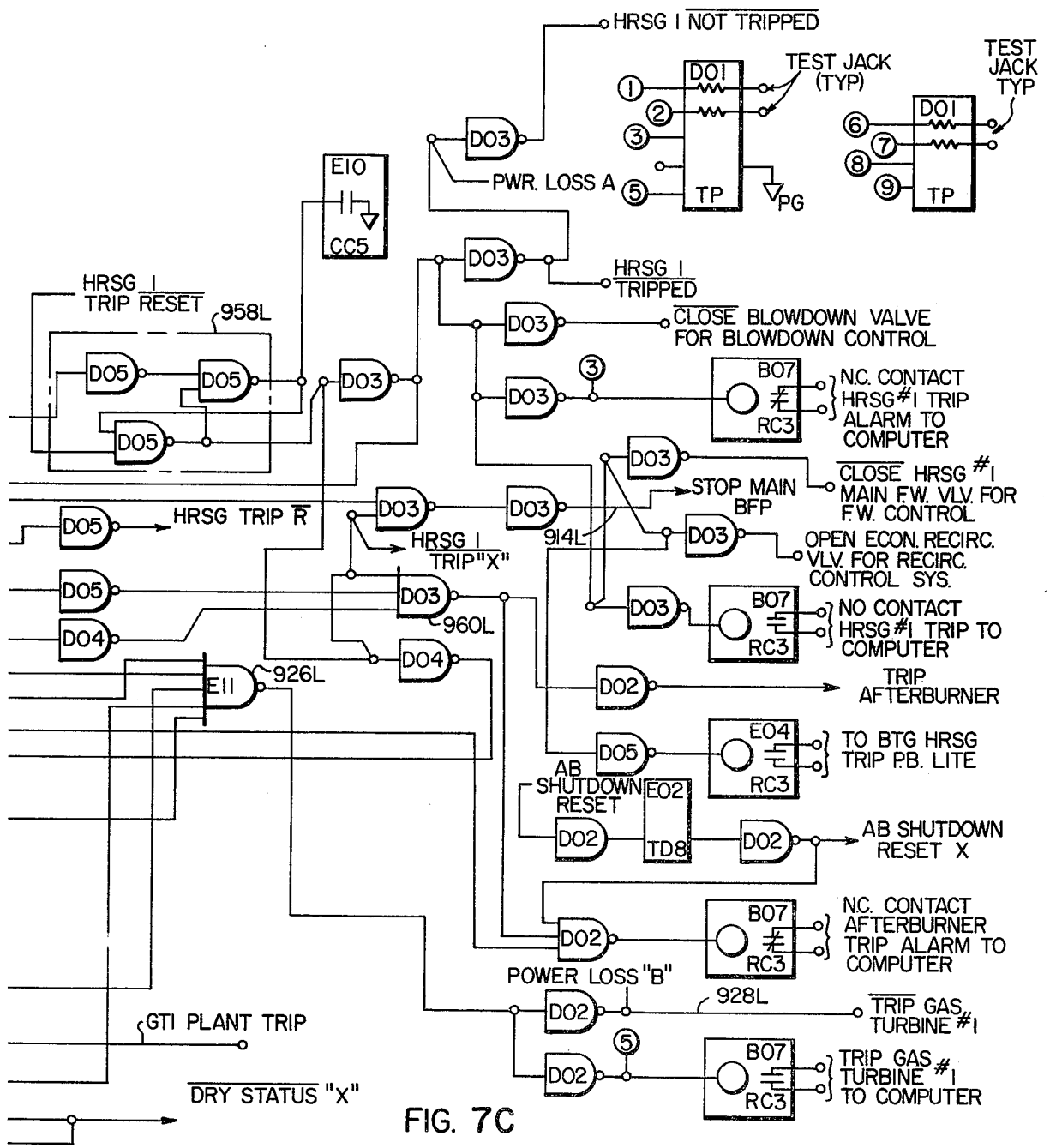

Further, a deaerator low level trip signal as derived from the level transducer 523 (see FIG. 2A) is applied by conductor 914L as seen in FIG. 7C to stop the main boiler feed pump 524. Further, when the pressure as developed across the main boiler feed pump 524 as sensed by the pressure sensor 530 falls below a minimum limit, an output is developed from the sensor 530 (see FIG. 2A) and applied by way of connector 943L, OR gate 936L and OR gate 960L to provide an afterburner trip, whereby the fuel supply valve 19a (or 19b) to the afterburner 16 is closed, thereby taking the afterburner out of service. The heat recovery steam generator trip flip-flop 958 L is comprised of two flip-flops and is responsive to a trip steam generator signal applied by way of OR gate 962L to provide an output whereby the remaining elements of the steam generator 18 are taken out of service. In particular, there is provided a close blowdown value signal, a stop main boiler feed pump signal, etc., whereby those functions that may be overlooked by the operator are automatically carried out to terminate the transfer of the steam generator control from a DRY to a WET mode of operation.

Thus, there has been shown and described the method and apparatus for transferring the heat recovery generator of a combined cycle electric power plant from a WET to a DRY mode of operation, whereby the gas turbine associated therewith may continue to be run, though at reduced power generating levels, to ensure maximum output even when a portion of the combined cycle electric power plant is taken out of service. The DRY mode of operation is effected without stopping the gas turbine and interlock controls ensure that no damage will occur to the steam generator, with a minimum of operator participation. At the same time, the interlock controls ensure that if the operator overlooks a certain step in the transfer process, this step is automatically implemented at the correct time.

Further, as explained in detail above, the steam supply valve 38 is not closed down until a substantial portion of the fluid contained within the steam generator 18 is directed by way of the superheater 46 to the condenser 31, to be stored in the make-up water storage tank 440. It is understood that the fluid circulated through the closed loop condensate/steam loop is pure and that its relatively high cost of manufacture dictates that to the degree possible, it be saved as opposed to being dispensed by way of the blowdown valve 596 to the sewer.

Though intended as a temporary mode of operation for purposes of repair to the steam generator 18, the steam generator 18 as described herein has been operated in a dry condition for a period of up to 6000 hours (250 days) without undue problems arising.

What is claimed is:

1. A method of operating a heat recovery steam generator of a combined cycle electric power plant, wherein said heat recovery steam generator is transferred from a first, steam generating mode of operation to a second, dry mode of operation, said combined cycle electric power plant comprising at least one gas turbine including an exit through which heated exhaust gases pass, said heat recovery steam generator being coupled to said gas turbine exit for transferring heat from the exhaust gases to a fluid passing through said heat recovery steam generator, a steam turbine coupled to receive superheated steam generated by said heat recovery steam generator, a first electric generator coupled to said gas turbine and driven thereby, a second electric generator coupled to said steam turbine and driven thereby, an afterburner for supplying additional heat to the exhaust gases passing from said gas turbine to said heat recovery steam generator, valve means for controlling the flow of fuel to said afterburner, condenser means for receiving and converting the spent steam from said steam turbine into condensate, first valve means for controlling the flow of condensate fluid to said heat recovery steam generator, second value means for controlling the flow of superheated steam to said steam turbine, said heat recovery steam generator comprising a low pressure storage tank, a first heat exchange tube, a boiler feedwater pump for supplying fluid from said low pressure storage tank to said first heat exchange tube, a main storage drum for receiving and storing water from said first heat exchange tube, a second heat exchange tube, and a high pressure pump for directing water from said main storage drum through said second heat exchange tube, said aforementioned elements of said heat recovery steam generator being interconnected to form a fluid flow path from said first to said second valve means, said method comprising the steps of:
 a. closing said first valve means to terminate the flow of condensate from said condenser to said heat recovery steam generator, while maintaining said second valve means open;
 b. reducing the load demand signal applied to said gas turbine to a point sufficient so that the temperature of the exhaust gas turbine gases directed to said heat recovery steam generator does not exceed a predetermined maximum limit;
 c. operating said heat recovery steam generator to generate steam therefrom as by the transfer of heat from the exhaust gas turbine gases to the fluid previously circulated thereto and directing the generated steam through said opened second valve means from said heat recovery steam generator, while extracting fluid from said low pressure storage tank, said main storage drum and said first and second heat exchange tubes; and
 d. closing said second valve means, thus terminating the flow of superheated steam from said heat recovery steam generator, while continuing to operate said gas turbine at reduced load levels.

2. The method of operating a heat recovery steam generator as claimed in claim 1, wherein said heat recovery steam generator further includes a blowdown conduit and a blowdown valve by which fluid may be extracted from said heat recovery steam generator, and wherein said method comprises the further step of opening said blowdown valve to extract fluid from said heat recovery steam generator.

3. The method of operating a heat recovery steam generator as claimed in claim 1, wherein said heat recovery steam generator includes a fuel supply valve means whereby fuel may be regulated to said afterburner, and wherein after step (b), said afterburner valve is closed.

4. The method of operating a heat recovery steam generator as claimed in claim 1, wherein said heat recovery steam generator includes a feed system for injecting corrosion inhibiting substances into the fluid directed through said heat recovery steam generator, and where, in said method before step (c), the supply of inhibiting substances from said feed system is terminated.

5. A method of operating a heat recovery steam generator as claimed in claim 1, wherein said heat recovery steam generator includes a steam extraction conduit interconnecting said steam turbine and said low pressure storage tank, and a valve for controlling the flow of extraction steam from said steam turbine to said low pressure storage tank, and where, in said method before step (c), said extraction steam control valve is closed.

6. The method as claimed in claim 1, wherein during step (c), the fluid level of said low pressure storage tank is measured and compared with a predetermined minimum limit thereof, and as the fluid is being drained from said low pressure storage tank, deactivating said boiler feed pump when the fluid level within said low pressure storage tank is less than the predetermined minimum limit.

7. The method of operating a heat recovery steam generator as claimed in claim 6, wherein said heat recovery steam generator further includes a deaerator, a third heat exchange tube for directing fluid from said low pressure storage tank to said deaerator, and a low pressure circulation pump, and wherein said method further comprises the step of closing said low pressure circulation valve.

8. The method as claimed in claim 6, wherein during step (c), said high pressure circulation pump means continues to run, and there is included the step of sensing the fluid level within said main drum and upon sensing a fluid level therein below a predetermined minimum limit, deactuating said high pressure circulation pump.

9. The method of controlling said heat recovery steam generator as claimed in claim 8, wherein said heat recovery steam generator further includes a seal chamber for said high pressure circulation pump means, and wherein said method comprises the step of measuring the temperature within said seal chamber and upon exceeding a predetermined maximum limit, deactuating said high pressure circulating pump.

10. The method of operating a heat recovery steam generator as claimed in claim 1, wherein said heat recovery steam generator includes a bypass conduit from said heat recovery steam generator to said condenser and a bypass control valve, and wherein said method further comprises the step of measuring the flow of steam to said steam turbine and upon sensing a steam flow less than a predetermined minimum limit, opening said bypass control valve to permit the flow of superheated steam directly to said condenser.

11. The method of operating a heat recovery steam generator as claimed in claim 10, wherein upon sensing a steam flow less than the predetermined minimum, closing said second valve means.

12. The method of operating a heat recovery steam generator as claimed in claim 1, wherein there is further included the step of measuring the steam flow to said steam generator and upon sensing a steam flow less than a predetermined minimum, closing said second valve means.

13. The method of operating a heat recovery steam generator as claimed in claim 1, wherein said heat recovery steam generator includes a blowdown conduit and a blowdown control valve wherein for regulating the flow of fluid from said heat recovery steam generator, and wherein said method includes the step of measuring the pressure within said heat recovery steam generator and upon detecting a pressure less than a predetermined minimum closing said blowdown valve.

14. The method of operating a heat recovery steam generator as claimed in claim 13, wherein said heat recovery steam generator includes a deaerator vent, and wherein said method comprises the step of, upon sensing pressure within said main storage drum less than a predetermined minimum limit, closing said blowdown valve.

15. The method of operating a heat recovery steam generator as claimed in claim 13, wherein said heat recovery steam generator further includes a supply of non-corroding fluid, and wherein said method comprises the step of, upon sensing a pressure within said heat recovery steam generator les than a predetermined minimum, introducing the non-corroding fluid into said heat recovery steam generator.

16. The method as claimed in claim 15, wherein the non-corroding fluid comprises nitrogen.

17. The method of operating a heat recovery steam generator as claimed in claim 15, wherein said heat recovery steam generator includes a bypass conduit from said heat recovery steam generator to said steam turbine and a bypass flow control valve therein, and wherein said method comprises the step of, upon sensing a fluid pressure within said heat recovery steam generator below the predetermined minimum limit, closing said bypass valve control means.

18. The method of operating a heat recovery steam generator as claimed in claim 1, wherein there is further included the step of measuring the temperature of the exhaust gas turbine gases as supplied to said heat recovery steam generator and upon sensing such a temperature in excess of a predetermined maximum limit, removing said gas turbine from operation.

19. The method of operating said heat recovery steam generator as claimed in claim 18, wherein said heat recovery steam generator includes a duct interconnecting said gas turbine and said heat recovery steam generator, and wherein said method includes the step of measuring the pressure within said duct and upon sensing such a pressure above a predetermined maximum limit, causing said gas turbine to be removed from service.

20. The method of operating a heat recovery steam generator as claimed in claim 18, wherein said heat recovery steam generator includes a stack cover disposable to a first position to close an opening within the topmost portion of said heat recovery steam generator and to a second position for permitting the flow of the gas turbine exhaust gases through said opening, and wherein said method further includes the step of determining whether said stack cover is closed and if so, removing said gas turbine from service.

21. A method of operating a combined cycle electric power plant comprising a heat recovery steam generator, wherein said heat recovery system generator is transferred from a first, steam generating mode of operation to a second, dry mode of operation, said combined cycle electric power plant further comprising at least one gas turbine including an exit through which heated exhaust gases pass to said heat recovery steam generator, a steam turbine coupled to said heat recovery steam generator and driven by the steam supply therefrom, means for generating electric power by the driving power of said turbines, said heat recovery steam generator having inlets for permitting the flow of fluid from said steam turbine thereto and outlets for permitting the flow of fluid to said steam turbine, said method comprising the steps of:

a. reducing the heat supplied to the gas turbine exhaust gases as directed to said heat recovery steam generator;

b. closing the fluid inlets to said heat recovery steam generator;

c. continuing to supply heat to said gas turbine exhaust gases whereby steam is continued to be generated by said heat recovery steam generator; and d. closing said outlets of said heat recovery steam generator.

22. The method of operating a combined cycle power plant as claimed in claim 21, wherein said plant includes a blowdown conduit and a blowdown control valve, and where, in said method after step (b), said blowdown valve is opened to permit further draining of the fluid from said heat recovery steam generator.

23. The method of operating a combined cycle power plant as claimed in claim 21, wherein said plant further includes a supply of non-corroding fluid, and where, in said method after step (d), permitting a flow of the non-corrosive fluid from said supply into said heat recovery steam generator.

24. A control system for a combined cycle electric power plant comprising at least one gas turbine including an exit through which heated exhaust gases pass, means for generating steam coupled to said gas turbine exit for transferring heat from the exhaust gases to a fluid passing through said steam generating means, a steam turbine coupled to said steam generating means and driven by the steam supplied thereby, means for generating electric power by the driving power of said turbines, condenser means for receiving and converting the spent steam from said steam turbine into condensate, and said steam generating means comprising a low pressure storage tank, a first heat exchange tube, a boiler feedwater pump for directing fluid from said low pressure storage tank through said first heat exchange tube, a main storage drum, a second heat exchange tube, and a high pressure recirculation pump for directing fluid from said main storage pump through said second heat exchange tube, said control system comprising:

monitoring means for measuring the temperature of the exhaust gas turbine gases as directed to said steam generating means and responsive to such a temperature above a predetermined level, for deactuating said steam turbine.

25. The control system for a combined cycle electric power plant as claimed in claim 24, wherein said steam generating means includes a duct to direct the gas turbine exhaust gases from said gas turbine to said steam generating means, and wherein said control system further comprises said monitoring means including further means for measuring the pressure within said duct and responsive to such a pressure above a predetermined limit, for deactuating the operation of said gas turbine.

26. The control system for a combined cycle electric power plant as claimed in claim 24, wherein said steam generating means includes a stack cover for selectively opening and closing an opening in a top portion of said steam generating means, 27. The control system for a combined cycle electric power plant as claimed in claim 24, wherein said monitoring means includes means for measuring the fluid level within said lower pressure storage tank and responsive to such a measurement below a predetermined level, for deactuating the operation of said boiler feedwater pump.

28. The control system for a combined cycle electric power plant as claimed in claim 24, wherein said monitoring means includes means for measuring the fluid level within said main storage drum and responsive to a measurement thereof below a predetermined minimum limit, or deactuating the operation of said high pressure recirculation pump.

29. A combined cycle electric power plant comprising:

a. at least one gas turbine including an exit through which heated exhaust gases pass;

b. means for generating steam coupled to said gas turbine exit for transferring heat from the exhaust gases to a fluid passing through said steam generating means;

c. a steam turbine coupled to said steam generating means and driven by the steam supplied thereby;

d. means for generating electric power by the driving power of said turbines;

e. condenser means for receiving and converting the spent steam from said steam turbine into condensate;

f. said steam generating means comprising a low pressure storage tank, a first heat exchange tube, a boiler feedwater pump for directing fluid from said low pressure storage tank through said first heat exchange tube, a main storage drum, a second heat exchange tube, and a high pressure recirculation pump for directing fluid from said main storage pump through said second heat exchange tube; and g. control means for transferring the operation of said steam generating means from a wet to a dry mode of operation, said transfer control means comprising means for measuring the temperature of the exhaust gas turbine gases as directed to said steam generating means and responsive to a temperature above a predetermined level, for deactuating said steam turbine.

30. The combined cycle electric power plant as claimed in claim 29, wherein said power plant comprises a duct to direct the gas turbine exhaust gases from said gas turbine to said steam generating means, and said control means includes means for measuring the pressure within said duct and responsive to such a pressure above a predetermined limit, for deactuating the operation of said gas turbine.

31. The combined cycle electric power plant as claimed in claim 29, wherein said steam generating means comprises a louvre for selectively opening and closing an opening in a top portion of said steam generating means, and said control means comprises means for detecting that said louvre is not fully open and reponsive thereto for deactuating said gas turbine.

32. The combined cycle electric power plant as claimed in claim 29, wherein said control means includes means for measuring the fluid level within said low pressure storage tank and responsive to such a measurement below a predetermined level, for deactuating the operation of said boiler feedwater pump.

33. The combined cycle electric power plant as claimed in claim 29, wherein said control means includes means for measuring the fluid level within said main storage drum and responsive to a measurement thereof below a predetermined minimum limit, for deactuating the operation of said high pressure recirculation pump.

* * * * *